US012095379B2

(12) United States Patent
Zhao

(10) Patent No.: US 12,095,379 B2
(45) Date of Patent: Sep. 17, 2024

(54) SYSTEMS AND METHODS FOR CONTROLLING SYNCHRONOUS RECTIFICATION WITH VARIABLE VOLTAGE REGULATION

(71) Applicant: ON-BRIGHT ELECTRONICS (SHANGHAI) CO., LTD., Shanghai (CN)

(72) Inventor: Chunsheng Zhao, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 149 days.

(21) Appl. No.: 17/857,475

(22) Filed: Jul. 5, 2022

(65) Prior Publication Data

US 2023/0010393 A1 Jan. 12, 2023

(30) Foreign Application Priority Data

Jul. 7, 2021 (CN) ........................ 202110771012.4

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............................ H02M 1/08; H02M 3/33592
See application file for complete search history.

(56) References Cited

U.S. PATENT DOCUMENTS 6,069,804 A 5/2000 Ingman et al.
6,091,233 A 7/2000 Hwang et al.
6,198,638 B1 3/2001 Lee
(Continued)

FOREIGN PATENT DOCUMENTS

CN 2529442 Y 1/2003
CN 101106333 A 1/2008
(Continued)

OTHER PUBLICATIONS

United States Patent and Trademark Office, Office Action mailed Feb. 29, 2024, in U.S. Appl. No. 18/225,512.
(Continued)

*Primary Examiner* — Jue Zhang
*Assistant Examiner* — Lakaisha Jackson
(74) *Attorney, Agent, or Firm* — Faegre Drinker Biddle & Reath LLP

(57) ABSTRACT

System and method for controlling synchronous rectification. For example, a system for controlling synchronous rectification includes: a first controller terminal configured to receive a first input voltage a second controller terminal biased to a second input voltage; a third controller terminal configured to output an output voltage; a first signal generator configured to generate a logic signal based on at least information associated with the first input voltage a second signal generator configured to receive the logic signal and generate an adjustment signal based on at least information associated with the logic signal and the first input voltage; and a driver configured to receive the logic signal and the adjustment signal and generate the output voltage based at least in part on the logic signal and the adjustment signal.

26 Claims, 11 Drawing Sheets

(56) References Cited

U.S. PATENT DOCUMENTS 6,972,969 B1 12/2005 Shteynberg et al.
7,173,835 B1 2/2007 Yang
7,447,049 B2 11/2008 Garner et al.
7,768,801 B2 8/2010 Usui et al.
7,791,903 B2 9/2010 Zhang et al.
7,826,237 B2 11/2010 Zhang et al.
7,869,231 B2 1/2011 Cohen
7,952,894 B2 5/2011 Lin et al.
8,102,676 B2 1/2012 Huynh et al.
8,134,851 B2 3/2012 Soldano et al.
8,391,028 B2 3/2013 Yeh
8,542,507 B2 9/2013 Hsu et al.
8,570,772 B2 10/2013 Morris et al.
8,953,342 B2 2/2015 Fang
9,413,246 B2 8/2016 Luo et al.
9,595,874 B2 3/2017 Cao et al.
9,602,006 B2 3/2017 Fahlenkamp
9,608,532 B2 3/2017 Wong et al.
9,787,198 B1 10/2017 Cao et al.
10,003,268 B2 6/2018 Fang et al.
10,063,131 B2 8/2018 Yang
10,063,153 B2 8/2018 Fang
10,122,284 B2 11/2018 Fang
10,148,189 B2 12/2018 Cao et al.
10,158,298 B2 12/2018 Lin et al.
10,193,451 B2 1/2019 Luo et al.
10,270,354 B1 4/2019 Lu et al.
10,411,604 B2 9/2019 Cao et al.
10,411,605 B2 9/2019 Cao et al.
10,432,096 B2 10/2019 Fang et al.
10,432,104 B2 10/2019 Li
10,483,856 B2 11/2019 Cao et al.
10,505,442 B2 12/2019 Wong et al.
10,516,341 B1 12/2019 Fu et al.
10,608,544 B2 3/2020 Moon et al.
10,622,902 B2 4/2020 Cao et al.
10,622,903 B2 4/2020 Cao et al.
10,651,747 B2 5/2020 Cao et al.
10,756,640 B1 8/2020 Radic et al.
10,819,211 B2 10/2020 Yang et al.
11,005,364 B1* 5/2021 Radic ..................... H02M 1/44
11,356,030 B2 6/2022 Miao
11,581,815 B2 2/2023 Cao et al.
11,588,405 B2 2/2023 Cao et al.
11,757,366 B2 9/2023 Cao et al.
11,764,684 B2 9/2023 Cao et al.
11,764,697 B2 9/2023 Zhao et al.
2002/0114172 A1 8/2002 Webb et al.
2003/0117119 A1 6/2003 Bridge
2004/0125621 A1 7/2004 Yang et al.
2005/0024897 A1 2/2005 Yang et al.
2005/0057951 A1 3/2005 Berghegger
2006/0018135 A1 1/2006 Yang et al.
2007/0014133 A1 1/2007 Shao et al.
2007/0139095 A1 6/2007 Fang et al.
2008/0037302 A1 2/2008 Yang
2008/0309312 A1 12/2008 Lin
2009/0168464 A1 7/2009 Lin et al.
2009/0257644 A1 10/2009 Dodzin et al.
2009/0322300 A1 12/2009 Melanson et al.
2010/0008106 A1 1/2010 Kawabe
2010/0027298 A1 2/2010 Cohen
2010/0128501 A1 5/2010 Huang et al.
2010/0219802 A1 9/2010 Lin et al.
2011/0002145 A1 1/2011 Halberstadt
2011/0019446 A1 1/2011 Wu et al.
2011/0044076 A1 2/2011 Zhang et al.
2011/0157919 A1 6/2011 Yedevelly
2011/0169463 A1 7/2011 Yang et al.
2011/0305055 A1 12/2011 Hsu et al.
2012/0032708 A1 2/2012 Coleman
2012/0075891 A1 3/2012 Zhang et al.
2012/0300506 A1 11/2012 Lee
2012/0300520 A1 11/2012 Ren et al.
2013/0033236 A1 2/2013 Li et al.
2013/0235620 A1 9/2013 Morris et al.
2013/0258723 A1 10/2013 Fang et al.
2013/0272036 A1 10/2013 Fang
2014/0021786 A1 1/2014 Fang
2014/0204625 A1 7/2014 Liu et al.
2014/0218976 A1 8/2014 Luo et al.
2014/0368254 A1 12/2014 Lee et al.
2014/0376272 A1 12/2014 Miao
2015/0070944 A1 3/2015 Fang
2015/0229223 A1* 8/2015 Cao ......................... H02M 1/08
363/21.13
2015/0249380 A1 9/2015 Hayakawa et al.
2015/0280584 A1 10/2015 Gong et al.
2016/0141961 A1* 5/2016 Odell ................ H02M 3/33507
363/21.17
2016/0149499 A1 5/2016 Fang
2016/0322909 A1 11/2016 Cao et al.
2017/0005578 A1 1/2017 Luo et al.
2017/0063246 A1 3/2017 Kong
2017/0126138 A1 5/2017 Cao et al.
2017/0155322 A1 6/2017 Zhang et al.
2017/0222569 A1 8/2017 Choi et al.
2017/0264287 A1 9/2017 Osanai
2017/0353099 A1 12/2017 Yang et al.
2018/0013352 A1 1/2018 Cao et al.
2018/0034377 A1 2/2018 Cao et al.
2018/0076720 A1 3/2018 Cao et al.
2018/0212527 A1 7/2018 Kong
2018/0248488 A1 8/2018 Cao et al.
2018/0294735 A1* 10/2018 Song ..................... H02M 1/083
2019/0020282 A1 1/2019 Li
2019/0068073 A1 2/2019 Cao et al.
2019/0393767 A1 12/2019 Hwang et al.
2019/0393790 A1 12/2019 Cao et al.
2020/0036293 A1 1/2020 Kannan
2020/0161985 A1 5/2020 Li et al.
2020/0280259 A1 9/2020 Cao et al.
2020/0280260 A1 9/2020 Cao et al.
2020/0336071 A1 10/2020 Iorio et al.
2020/0343810 A1 10/2020 Xu et al.
2021/0091675 A1* 3/2021 Rajesh .............. H02M 3/33507
2021/0226540 A1 7/2021 Zhao et al.
2021/0376746 A1 12/2021 Cao et al.
2022/0006392 A1* 1/2022 Chen ....................... H02M 3/01
2022/0294355 A1 9/2022 Lin et al.
2022/0329171 A1 10/2022 Zhao et al.
2023/0033953 A1 2/2023 Cao
2024/0063724 A1 2/2024 Cao et al.
2024/0072678 A1 2/2024 Zhao et al.

FOREIGN PATENT DOCUMENTS

CN 101188384 A 5/2008
CN 101272089 A 9/2008
CN 101378232 A 3/2009
CN 201238265 Y 5/2009
CN 201435677 Y 3/2010
CN 101841247 A 9/2010
CN 102017376 A 4/2011
CN 102104338 A 6/2011
CN 102217181 A 10/2011
CN 102231605 A 11/2011
CN 102647074 A 8/2012
CN 102723856 A 10/2012
CN 102790531 A 11/2012
CN 102882377 A 1/2013
CN 103296867 A 9/2013
CN 103378751 A 10/2013
CN 103501112 A 1/2014
CN 103728572 A 4/2014
CN 103887980 A 6/2014
CN 102185501 B 9/2014
CN 104300793 A 1/2015
CN 104393763 A 3/2015
CN 105322800 A 2/2016
CN 105356727 A 2/2016
CN 106026703 A 10/2016
CN 107104598 A 8/2017
CN 206379873 U 8/2017

(56) References Cited

FOREIGN PATENT DOCUMENTS

| | | | |
|---|---|---|---|
| CN | 107342691 | A | 11/2017 |
| CN | 107579670 | A | 1/2018 |
| CN | 107872158 | A | 4/2018 |
| CN | 107979289 | A | 5/2018 |
| CN | 108566104 | A | 9/2018 |
| CN | 105846695 | B | 11/2018 |
| CN | 108736749 | A | 11/2018 |
| CN | 108880296 | A | 11/2018 |
| CN | 109274272 | A | 1/2019 |
| CN | 106130349 | B | 3/2019 |
| CN | 109802559 | A | 5/2019 |
| CN | 110620514 | A | 12/2019 |
| CN | 209913730 | U | 1/2020 |
| CN | 110896283 | A | 3/2020 |
| CN | 110995013 | A | 4/2020 |
| CN | 111146961 | A | 5/2020 |
| CN | 111193407 | A | 5/2020 |
| CN | 111404403 | A | 7/2020 |
| CN | 211296573 | U | 8/2020 |
| CN | 111697838 | A | 9/2020 |
| CN | 111865095 | A | 10/2020 |
| CN | 112688570 | A | 4/2021 |
| CN | 112803773 | A | 5/2021 |
| EP | 2525480 | A1 | 11/2012 |
| JP | 2000-014136 | A | 1/2000 |
| JP | 2007-028894 | A | 2/2007 |
| JP | 2009-124296 | A | 6/2009 |
| JP | 2009-261042 | A | 11/2009 |
| JP | 2009-278717 | A | 11/2009 |
| JP | 5285602 | B2 | 9/2013 |
| JP | 6351787 | B2 | 7/2018 |
| TW | 200717978 | A | 5/2007 |
| TW | I366335 | B | 6/2012 |
| TW | 201234854 | A | 8/2012 |
| TW | I401866 | B | 7/2013 |
| TW | I436571 | B | 5/2014 |
| TW | I448064 | B | 8/2014 |
| TW | 201521347 | A | 6/2015 |
| TW | I489751 | B | 6/2015 |
| TW | 201537882 | A | 10/2015 |
| TW | I509971 | B | 11/2015 |
| TW | 201707361 | A | 2/2017 |
| TW | I625924 | B | 6/2018 |
| TW | I635699 | B | 9/2018 |
| TW | 201919322 | A | 5/2019 |
| TW | 201933752 | A | 8/2019 |
| TW | 201937834 | A | 9/2019 |
| TW | 202002494 | A | 1/2020 |
| TW | 202019066 | A | 5/2020 |
| TW | 202110051 | A | 3/2021 |
| TW | 202114333 | A | 4/2021 |

OTHER PUBLICATIONS

Chinese Patent Office, Office Action issued Apr. 6, 2022, in Application No. 202110771012.4.

Chinese Patent Office, Office Action issued Dec. 20, 2017, in Application No. 201610345719.8.

Chinese Patent Office, Office Action issued Dec. 30, 2021, in Application No. 202110379198.9.

Chinese Patent Office, Office Action issued Jan. 26, 2014, in Application No. 201210118202. 7.

Chinese Patent Office, Office Action issued Jul. 5, 2022, in Application No. 202110865735.0.

Chinese Patent Office, Office Action issued Mar. 1, 2022, in Application No. 202110379198.9.

Chinese Patent Office, Office Action issued Mar. 19, 2021, in Application No. 202010063404.0.

Chinese Patent Office, Office Action issued Mar. 29, 2022, in Application No. 202110263198.2.

Chinese Patent Office, Office Action issued May 25, 2016, in Application No. 201410729533.3.

Chinese Patent Office, Office Action issued Nov. 2, 2021, in Application No. 202110263198.2.

Chinese Patent Office, Office Action issued Nov. 9, 2018, in Application No. 201710534527.6.

Chinese Patent Office, Office Action issued Oct. 28, 2015, in Application No. 201410093010.4.

Chinese Patent Office, Office Action issued Sep. 4, 2018, in Application No. 201710102817.3.

Li, Longwen, "Newest Switch Power Supply Design Procedures and Steps," Chapter 8, Section 4, pp. 455-458, 2008.

Liu, Shengli, "Practical New Technology of High Frequency Switch Power Supply," Chapter 6, pp. 100-117, 2006.

Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.

Taiwan Intellectual Property Office, Office Action issued Apr. 13, 2022, in Application No. 110129676.

Taiwan Intellectual Property Office, Office Action issued Dec. 2, 2016, in Application No. 104101330.

Taiwan Intellectual Property Office, Office Action issued Dec. 27, 2017, in Application No. 106111598.

Taiwan Intellectual Property Office, Office Action issued Feb. 23, 2021, in Application No. 109128639.

Taiwan Intellectual Property Office, Office Action issued Mar. 8, 2021, in Application No. 109110084.

Taiwan Intellectual Property Office, Office Action issued May 3, 2022, in Application No. 110138601.

Taiwan Intellectual Property Office, Office Action issued May 4, 2017, in Application No. 105122491.

Taiwan Intellectual Property Office, Office Action issued Oct. 24, 2018, in Application No. 106140199.

Taiwan Intellectual Property Office, Office Action issued Oct. 9, 2014, in Application No. 101118860.

United States Patent and Trademark Office, Notice of Allowance mailed Apr. 15, 2021, in U.S. Appl. No. 16/503,916.

United States Patent and Trademark Office, Notice of Allowance mailed Feb. 8, 2022, in U.S. Appl. No. 16/503,916.

United States Patent and Trademark Office, Notice of Allowance mailed Jul. 12, 2022, in U.S. Appl. No. 16/787,869.

United States Patent and Trademark Office, Notice of Allowance mailed Jul. 13, 2022, in U.S. Appl. No. 16/786,372.

United States Patent and Trademark Office, Notice of Allowance mailed Jul. 6, 2022, in U.S. Appl. No. 16/503,916.

United States Patent and Trademark Office, Office Action mailed Jan. 10, 2020, in U.S. Appl. No. 16/503,916.

United States Patent and Trademark Office, Office Action mailed Sep. 10, 2021, in U.S. Appl. No. 16/786,372.

United States Patent and Trademark Office, Office Action mailed Sep. 18, 2020, in U.S. Appl. No. 16/503,916.

United States Patent and Trademark Office, Office Action mailed Sep. 10, 2021, in U.S. Appl. No. 16/787,869.

Beijing East IP Ltd., Statement attached with a Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.

State Intellectual Property Office of China, Formal Letter of Examination issued Dec. 2, 2015, in Application No. 201210118202.7.

State Intellectual Property Office of China, print-out of bibliographic data from http://cpquery.sipo.gov.cn of Chinese Patent Application No. 201210118202.7, dated Feb. 25, 2016.

United States Patent and Trademark Office, Notice of Allowance mailed Apr. 27, 2023, in U.S. Appl. No. 17/333,844.

United States Patent and Trademark Office, Notice of Allowance mailed May 12, 2023, in U.S. Appl. No. 16/786,372.

United States Patent and Trademark Office, Notice of Allowance mailed May 5, 2023, in U.S. Appl. No. 17/152,418.

Taiwan Intellectual Property Office, Office Action mailed Oct. 11, 2022, in Application No. 110136342.

United States Patent and Trademark Office, Notice of Allowance mailed Oct. 19, 2022, in U.S. Appl. No. 16/503,916.

(56) References Cited

OTHER PUBLICATIONS

United States Patent and Trademark Office, Notice of Allowance mailed Oct. 3, 2022, in U.S. Appl. No. 16/787,869.
United States Patent and Trademark Office, Office Action mailed Oct. 14, 2022, in U.S. Appl. No. 16/786,372.
United States Patent and Trademark Office, Office Action mailed Oct. 17, 2022, in U.S. Appl. No. 17/333,844.
Chinese Patent Office, Office Action issued Mar. 16, 2023, in Application No. 202010471872.1.
Taiwan Intellectual Property Office, Office Action mailed Nov. 11, 2022, in Application No. 110142621.
United States Patent and Trademark Office, Notice of Allowance mailed Feb. 2, 2023, in U.S. Appl. No. 17/333,844.
United States Patent and Trademark Office, Notice of Allowance mailed Jan. 20, 2023, in U.S. Appl. No. 17/152,418.
United States Patent and Trademark Office, Notice of Allowance mailed Mar. 15, 2023, in U.S. Appl. No. 17/333,844.
United States Patent and Trademark Office, Notice of Allowance mailed Mar. 29, 2023, in U.S. Appl. No. 16/786,372.
United States Patent and Trademark Office, Notice of Allowance mailed Mar. 18, 2024, in U.S. Appl. No. 17/689,860.
United States Patent and Trademark Office, Office Action mailed Mar. 22, 2024, in U.S. Appl. No. 18/229,596.
United States Patent and Trademark Office, Office Action mailed May 29, 2024, in U.S. Appl. No. 17/714,821.
United States Patent and Trademark Office, Notice of Allowance mailed Jul. 24, 2024, in U.S. Appl. No. 18/225,512.

* cited by examiner

SYSTEMS AND METHODS FOR CONTROLLING SYNCHRONOUS RECTIFICATION WITH VARIABLE VOLTAGE REGULATION

1. CROSS-REFERENCES TO RELATED APPLICATIONS

This application claims priority to Chinese Patent Application No. 202110771012.4, filed Jul. 7, 2021, incorporated by reference herein for all purposes.

2. BACKGROUND OF THE INVENTION

Certain embodiments of the present invention are directed to circuits. More particularly, some embodiments of the invention provide systems and methods for controlling synchronous rectification with variable voltage regulation. Merely by way of example, some embodiments of the invention have been applied to flyback power converters. But it would be recognized that the invention has a much broader range of applicability.

With development of the modern electronics, the operation voltage of many electronic circuits has become lower, but the operation current of the electronic circuits has become higher. Accordingly, the overall power consumption of the electronic circuits has become more important for circuit design. In a conventional power converter, the rectification circuit on the secondary side often employs a Schottky diode, but as the operation voltage decreases, the power efficiency of the rectification circuit also decreases. To improve power efficiency, the synchronous rectification technique has been used for power converters that have low operation voltage and high operation current. Usually, the synchronous rectification technique achieves high power efficiency by replacing the Schottky diode with a power metal-oxide-semiconductor field-effect transistors (MOSFET) with low on-resistance.

FIG. 1 is a simplified diagram showing a conventional flyback power converter with synchronous rectification. As shown in FIG. 1, the flyback power converter 100 includes a primary winding 110, a secondary winding 112, and an auxiliary winding 2114, all of which are parts of a transformer (e.g., a transformer T). On the primary side, the flyback power converter 100 also includes a bridge rectifier 120 (e.g., a rectifier that includes four diodes), a resistor 130 (e.g., $R_{st}$), a resistor 132 (e.g., $R_{cs}$), a capacitor 140 (e.g., $C_{bulk}$), a capacitor 142 (e.g., $C_p$), a transistor 150 (e.g., a power MOSFET MS1), a pulse-width-modulation controller 152 (e.g., a controller chip U1), a resistor 2134 (e.g., $R_{sn}$), a diode 2144 (e.g., $D_p$), a diode 2146 (e.g., $D_{sn}$), and a capacitor 2148 (e.g., $C_{sn}$). The resistor 2134 (e.g., $R_{sn}$), the diode 2146 (e.g., $D_{sn}$), and the capacitor 2148 (e.g., $C_{sn}$) are parts of a Resistor-Capacitor-Diode (RCD) claim circuit. Additionally, on the secondary side, the flyback power converter 100 also includes a controller 160 for synchronous rectification (e.g., a controller chip U2), a capacitor 170 (e.g., $C_{out}$), a transistor 180 (e.g., a MOSFET MS2), and a body diode 190 (e.g., a parasitic diode of the transistor 180).

As shown in FIG. 1, an alternating current (AC) input voltage 122 is rectified by the bridge rectifier 120 and then filtered by the capacitor 140 (e.g., $C_{bulk}$). One terminal of the capacitor 140 (e.g., $C_{bulk}$) is connected to one terminal of the resistor 130 (e.g., $R_{st}$) and one terminal of the primary winding 110. The one terminal of the primary winding 110 is connected to one terminal of the resistor 2134 (e.g., $R_{sn}$) and one terminal of the capacitor 2148 (e.g., $C_{sn}$). Another terminal of the resistor 2134 (e.g., $R_{sn}$) and another terminal of the capacitor 2148 (e.g., $C_{sn}$) are connected to one terminal of the diode 2146 (e.g., $D_{sn}$). Another terminal of the primary winding 110 is connected to another terminal of the diode 2146 (e.g., $D_{sn}$) and the drain terminal of the transistor 150 (e.g., a MOSFET MS1). Another terminal of the resistor 130 (e.g., $R_{st}$) is connected to one terminal of the capacitor 142 (e.g., $C_p$), one terminal of the diode 2144 (e.g., $D_p$), and a terminal 154 (e.g., VCC) of the pulse-width-modulation controller 152 (e.g., the controller chip U1). Another terminal of the diode 2144 (e.g., $D_p$) is connected to one terminal of the auxiliary winding 2114. Another terminal of the capacitor 142 (e.g., $C_p$) and another terminal of the auxiliary winding 2114 are biased to the ground voltage on the primary side.

Additionally, a terminal 156 (e.g., gate1) of the pulse-width-modulation controller 152 (e.g., the controller chip U1) is connected to the gate terminal of the transistor 150 (e.g., a MOSFET MS1). The pulse-width-modulation controller 152 (e.g., the controller chip U1) outputs a voltage 148 through the terminal 156 (e.g., gate1) to the gate terminal of the transistor 150 (e.g., a MOSFET MS1). A terminal 158 (e.g., CS) of the pulse-width-modulation controller 152 (e.g., the controller chip U1) is connected to the source terminal of the transistor 150 (e.g., a MOSFET MS1) and is also connected to one terminal of the resistor 132 (e.g., $R_{cs}$). Another terminal of the resistor 132 (e.g., $R_{cs}$) and a terminal 144 (e.g., GND) of the pulse-width-modulation controller 152 (e.g., the controller chip U1) both are biased to the ground voltage on the primary side.

One terminal of the secondary winding 112 is connected to the cathode of the body diode 190, the drain terminal of the transistor 180 (e.g., a MOSFET MS2), and a terminal 162 (e.g., $V_d$) of the controller 160 for synchronous rectification (e.g., the controller chip U2). Additionally, another terminal of the secondary winding 112 is connected to one terminal of the capacitor 170 (e.g., $C_{out}$) and is also connected to a terminal 164 (e.g., $V_{in}$) of the controller 160 for synchronous rectification (e.g., the controller chip U2). The source terminal of the transistor 180 (e.g., a MOSFET MS2) is connected to the anode of the body diode 190, and the gate terminal of the transistor 180 (e.g., a MOSFET MS2) is connected to a terminal 166 (e.g., gate2) of the controller 160 for synchronous rectification (e.g., the controller chip U2). Another terminal of the capacitor 170 (e.g., $C_{out}$), the source terminal of the transistor 180 (e.g., a MOSFET MS2), and a terminal 168 (e.g., GND) of the controller 160 for synchronous rectification (e.g., the controller chip U2) all are biased to the ground voltage on the secondary side. The output voltage 172 (e.g., $V_{out}$) represents the voltage drop between the two terminals of the capacitor 170 (e.g., $C_{out}$). Also as shown in FIG. 1, a current 146 flows through the primary winding 110, and a current 192 (e.g., $I_{sec}$) flows through the secondary winding 112. The controller 160 for synchronous rectification (e.g., the controller chip U2) receives a voltage 194 through the terminal 162 (e.g., $V_d$) from the drain terminal of the transistor 180 (e.g., a MOSFET MS2), and outputs a voltage 196 through the terminal 166 (e.g., gate2) to the gate terminal of the transistor 180 (e.g., a MOSFET MS2).

For the flyback power converter 100, the controller 160 for synchronous rectification (e.g., the controller chip U2) and the transistor 180 (e.g., a MOSFET MS2) are parts of a synchronous rectification system (e.g., a synchronous rectifier). The synchronous rectification system replaces a Schottky diode in order to raise power efficiency (e.g., reducing heat generation) and improve current generation capability. Such synchronous rectification system often is used in a system with a large output current.

FIG. 2 is a simplified diagram showing another conventional flyback power converter with synchronous rectification. As shown in FIG. 2, the flyback power converter 200 includes a primary winding 210, a secondary winding 212, and an auxiliary winding 2214, all of which are parts of a transformer (e.g., a transformer T). On the primary side, the flyback power converter 200 also includes a bridge rectifier 220 (e.g., a rectifier that includes four diodes), a resistor 230 (e.g., $R_{st}$), a resistor 232 (e.g., $R_{cs}$), a capacitor 240 (e.g., $C_{bulk}$), a capacitor 242 (e.g., $C_p$), a transistor 250 (e.g., a power MOSFET MS1), a pulse-width-modulation controller 252 (e.g., a controller chip U1), a resistor 2234 (e.g., $R_{sn}$), a diode 2244 (e.g., $D_p$), a diode 2246 (e.g., $D_{sn}$), and a capacitor 2248 (e.g., $C_{sn}$). The resistor 2234 (e.g., $R_{sn}$), the diode 2246 (e.g., $D_{sn}$), and the capacitor 2248 (e.g., $C_{sn}$) are parts of a Resistor-Capacitor-Diode (RCD) claim circuit. Additionally, on the secondary side, the flyback power converter 200 also includes a controller 260 for synchronous rectification (e.g., a controller chip U2), a capacitor 270 (e.g., $C_{out}$), a transistor 280 (e.g., a MOSFET MS2), and a body diode 290 (e.g., a parasitic diode of the transistor 280).

As shown in FIG. 2, an alternating current (AC) input voltage 222 is rectified by the bridge rectifier 220 and then filtered by the capacitor 240 (e.g., $C_{bulk}$). One terminal of the capacitor 240 (e.g., $C_{bulk}$) is connected to one terminal of the resistor 230 (e.g., $R_{st}$) and one terminal of the primary winding 210. The one terminal of the primary winding 210 is connected to one terminal of the resistor 2234 (e.g., $R_{sn}$) and one terminal of the capacitor 2248 (e.g., $C_{sn}$). Another terminal of the resistor 2234 (e.g., $R_{sn}$) and another terminal of the capacitor 2248 (e.g., $C_{sn}$) are connected to one terminal of the diode 2246 (e.g., $D_{sn}$). Another terminal of the primary winding 210 is connected to another terminal of the diode 2246 (e.g., $D_{sn}$) and the drain terminal of the transistor 250 (e.g., a MOSFET MS1). Another terminal of the resistor 230 (e.g., $R_{st}$) is connected to one terminal of the capacitor 242 (e.g., $C_p$), one terminal of the diode 2244 (e.g., $D_p$), and a terminal 254 (e.g., VCC) of the pulse-width-modulation controller 252 (e.g., the controller chip U1). Another terminal of the diode 2244 (e.g., $D_p$) is connected to one terminal of the auxiliary winding 2214. Another terminal of the capacitor 242 (e.g., $C_p$) and another terminal of the auxiliary winding 2214 are biased to the ground voltage on the primary side.

Additionally, a terminal 256 (e.g., gate1) of the pulse-width-modulation controller 252 (e.g., the controller chip U1) is connected to the gate terminal of the transistor 250 (e.g., a MOSFET MS1). The pulse-width-modulation controller 252 (e.g., the controller chip U1) outputs a voltage 248 through the terminal 256 (e.g., gate1) to the gate terminal of the transistor 250 (e.g., a MOSFET MS1). A terminal 258 (e.g., CS) of the pulse-width-modulation controller 252 (e.g., the controller chip U1) is connected to the source terminal of the transistor 250 (e.g., a MOSFET MS1) and is also connected to one terminal of the resistor 232 (e.g., $R_{cs}$). Another terminal of the resistor 232 (e.g., $R_{cs}$) and a terminal 244 (e.g., GND) of the pulse-width-modulation controller 252 (e.g., the controller chip U1) both are biased to the ground voltage on the primary side.

One terminal of the secondary winding 212 is connected to the anode of the body diode 290, the source terminal of the transistor 280 (e.g., a MOSFET MS2), and a terminal 268 (e.g., GND) of the controller 260 for synchronous rectification (e.g., the controller chip U2). Additionally, another terminal of the secondary winding 212 is biased to the ground voltage on the secondary side. The gate terminal of the transistor 280 (e.g., a MOSFET MS2) is connected to a terminal 266 (e.g., gate2) of the controller 260 for synchronous rectification (e.g., the controller chip U2). The drain terminal of the transistor 280 (e.g., a MOSFET MS2) is connected to the cathode of the body diode 290, a terminal 262 (e.g., $V_d$) of the controller 260 for synchronous rectification (e.g., the controller chip U2), and one terminal of the capacitor 270 (e.g., $C_{out}$). Another terminal of the capacitor 270 (e.g., $C_{out}$) is biased to the ground voltage on the secondary side. The output voltage 272 (e.g., $V_{out}$) represents the voltage drop between the two terminals of the capacitor 270 (e.g., $C_{out}$). A terminal 264 (e.g., $V_{in}$) of the controller 260 for synchronous rectification (e.g., the controller chip U2) is not biased (e.g., floating electrically).

Also as shown in FIG. 2, a current 246 flows through the primary winding 210, and a current 292 (e.g., $I_{sec}$) flows through the secondary winding 212. The controller 260 for synchronous rectification (e.g., the controller chip U2) receives a voltage 294 through the terminal 262 (e.g., $V_d$) from the drain terminal of the transistor 280 (e.g., a MOSFET MS2), and outputs a voltage 296 through the terminal 266 (e.g., gate2) to the gate terminal of the transistor 280 (e.g., a MOSFET MS2).

Usually, the flyback power converter 100 can operate in different modes depending on the input voltage, the output voltage, and/or the output current of the flyback power converter 100, and the flyback power converter 200 can also operate in different modes depending on the input voltage, the output voltage, and/or the output current of the flyback power converter 200. These different modes include discontinuous conduction mode (DCM), quasi resonant (QR) mode, and continuous conduction mode (CCM). The continuous conduction mode (CCM) includes the shallow continuous conduction mode (SCCM) and the deep continuous conduction mode (DCCM), wherein the shallow continuous conduction mode (SCCM) can serve as a transition from the discontinuous conduction mode (DCM) to the deep continuous conduction mode (DCCM).

FIG. 3 is a simplified diagram showing a conventional controller 360 for synchronous rectification. The controller 360 for synchronous rectification includes a terminal 362 (e.g., $V_d$), a terminal 364 (e.g., $V_{in}$), a terminal 366 (e.g., gate2), and a terminal 368 (e.g., GND). As shown in FIG. 3, the controller 360 for synchronous rectification also includes a low-dropout regulator 310, a reference signal generator 320, a switch 330 (e.g., a transistor), a NOR gate 344, a voltage adjustment component 350, a comparator 352, a minimum on-time controller 354, a NOR gate 374, a flip-flop 380, a driver 390, a voltage adjustment component 2370, a comparator 2372, and a turn-on controller 2340.

In some embodiments, the controller 360 for synchronous rectification is used as the controller 160 for synchronous rectification of the flyback power converter 100. In certain examples, the terminal 362 (e.g., $V_d$) is used as the terminal 162 (e.g., $V_d$), the terminal 364 (e.g., $V_{in}$) is used as the terminal 164 (e.g., $V_{in}$), the terminal 366 (e.g., gate2) is used as the terminal 166 (e.g., gate2), and the terminal 368 (e.g., GND) is used as the terminal 168 (e.g., GND). In some examples, the terminal 362 (e.g., $V_d$) receives a voltage 332 that is the same as the drain voltage of the transistor 180 (e.g., a MOSFET MS2), and the terminal 368 (e.g., GND) is biased to the ground voltage on the secondary side of the flyback power converter 100. For example, a voltage difference from the voltage 332 at the terminal 362 (e.g., $V_d$) to a voltage 2368 (e.g., the ground voltage) at the terminal 368 (e.g., GND) is the same as a voltage difference from the drain terminal to the source terminal of the transistor 180 (e.g., a MOSFET MS2). As an example, the voltage difference from the voltage 332 at the terminal 362 (e.g., $V_d$) to the voltage 2368 (e.g., the ground voltage) at the terminal 368 (e.g., GND) is equal to the voltage 332 at the terminal 362 (e.g., $V_d$) minus the voltage 2368 (e.g., the ground voltage) at the terminal 368 (e.g., GND), and the voltage difference from the drain terminal to the source terminal of the transistor 180 (e.g., a MOSFET MS2) is equal to the drain voltage at the drain terminal minus the source voltage at the source terminal of the transistor 180 (e.g., a MOSFET MS2).

In certain embodiments, the controller 360 for synchronous rectification is used as the controller 260 for synchronous rectification of the flyback power converter 200. In some examples, the terminal 362 (e.g., $V_d$) is used as the terminal 262 (e.g., $V_d$), the terminal 364 (e.g., $V_{in}$) is used as the terminal 264 (e.g., $V_{in}$), the terminal 366 (e.g., gate2) is used as the terminal 266 (e.g., gate2), and the terminal 368 (e.g., GND) is used as the terminal 268 (e.g., GND). In certain examples, the terminal 362 (e.g., $V_d$) receives the voltage 332 that is the same as the drain voltage of the transistor 280 (e.g., a MOSFET MS2), and the terminal 368 (e.g., GND) is connected to the source terminal of the transistor 280 (e.g., a MOSFET MS2). For example, a voltage difference from the voltage 332 at the terminal 362 (e.g., $V_d$) to the voltage 2368 at the terminal 368 (e.g., GND) is the same as a voltage difference from the drain terminal to the source terminal of the transistor 280 (e.g., a MOSFET MS2). As an example, the voltage difference from the voltage 332 at the terminal 362 (e.g., $V_d$) to the voltage 2368 (e.g., the ground voltage) at the terminal 368 (e.g., GND) is equal to the voltage 332 at the terminal 362 (e.g., $V_d$) minus the voltage 2368 (e.g., the ground voltage) at the terminal 368 (e.g., GND), and the voltage difference from the drain terminal to the source terminal of the transistor 280 (e.g., a MOSFET MS2) is equal to the drain voltage at the drain terminal minus the source voltage at the source terminal of the transistor 280 (e.g., a MOSFET MS2).

As shown in FIG. 3, the low-dropout regulator 310 receives an input voltage 312 through the terminal 364 and the voltage 332 through the terminal 362 and generates a supply voltage 314 (e.g., AVDD) based at least in part on the input voltage 312 and/or the voltage 332. If the terminal 364 is not biased (e.g., floating electrically), the low-dropout regulator 310 generates the supply voltage 314 (e.g., AVDD) based at least in part on the voltage 332. The supply voltage 314 is received by the reference signal generator 320, which in response generates one or more predetermined reference voltages (e.g., $V_{ref}$) and/or one or more predetermined reference currents (e.g., $I_{ref}$). Additionally, the supply voltage 314 is also received by the gate terminal of the transistor 330 (e.g., a high-voltage transistor). The drain terminal of the transistor 330 receives the voltage 332 through the terminal 362, and the source terminal of the transistor 330 is biased at a voltage 334. If the transistor 330 is turned on by the supply voltage 314, the voltage 334 is equal to the voltage 332. The voltage 334 is received by the voltage adjustment component 350 and the voltage adjustment component 2370.

The voltage adjustment component 350 receives the voltage 334 and generates a voltage 351 based at least in part on the voltage 334. The voltage 351 is equal to the voltage 334 minus a predetermined threshold voltage (e.g., $V_t$ (on)), and the predetermined threshold voltage (e.g., $V_t$ (on)) is negative. Hence, if the transistor 330 is turned on, $$V_{351}=V_{332}-V_t\,(\mathrm{on}) \quad \text{(Equation 1)}$$

where $V_{351}$ represents the voltage 351, and $V_{332}$ represents the voltage 332. Additionally, $V_t$ (on) represents the predetermined threshold voltage, which has a negative value.

As shown in FIG. 3, the voltage 351 is received by the non-inverting input terminal (e.g., the "+" input terminal) of the comparator 352, which also includes an inverting input terminal (e.g., the "−" input terminal). The inverting input terminal of the comparator 352 is biased to the ground voltage (e.g., the ground voltage on the secondary side). Based at least in part on the voltage 351 received by the non-inverting input terminal and the ground voltage received by the inverting input terminal, the comparator 352 generates a signal 353. The signal 353 is at a logic high level if the voltage 351 is higher than the ground voltage, and the signal 353 is at a logic low level if the voltage 351 is lower than the ground voltage. Referring to Equation 1, when the transistor 330 is turned on, if the voltage 332 is larger than the predetermined threshold voltage (e.g., $V_t$ (on)), the signal 353 (e.g., on det) is at the logic high level, and if the voltage 332 is smaller than the predetermined threshold voltage (e.g., $V_t$ (on)), the signal 353 (e.g., on det) is at the logic low level. The signal 353 (e.g., on det) is received by the NOR gate 344.

The voltage adjustment component 2370 receives the voltage 334 and generates a voltage 2371 based at least in part on the voltage 334. The voltage 2371 is equal to the voltage 334 minus a predetermined threshold voltage (e.g., $V_t$ (off)), and the predetermined threshold voltage (e.g., $V_t$ (off)) is negative, positive, or equal to zero. Hence, if the transistor 330 is turned on, $$V_{2371}=V_{332}-V_t\,(\mathrm{off}) \quad \text{(Equation 2)}$$

where $V_{2371}$ represents the voltage 2371, and $V_{332}$ represents the voltage 332. Additionally, $V_t$ (off) represents the predetermined threshold voltage, which has a negative value, a zero value, or a positive value.

As shown in FIG. 3, the voltage 2371 is received by an inverting input terminal (e.g., the "−" input terminal) of the comparator 2372, which also includes a non-inverting input terminal (e.g., the "+" input terminal). The non-inverting input terminal of the comparator 2372 is biased to the ground voltage (e.g., the ground voltage on the secondary side). Based at least in part on the voltage 2371 received by the inverting input terminal and the ground voltage received by the non-inverting input terminal, the comparator 2372 generates a signal 372. The signal 372 is at a logic high level if the voltage 2371 is lower than the ground voltage, and the signal 372 is at a logic low level if the voltage 2371 is higher than the ground voltage. The signal 372 is received by the NOR gate 374.

A signal 382 is received by the minimum on-time controller 354, which in response, generates a signal 355 based at least in part on the signal 382. If the signal 382 changes from the logic low level to the logic high level when the signal 355 is at the logic low level, the signal 355 changes from the logic low level to the logic high level. After the signal 355 changes from the logic low level to the logic high level, the signal 355 remains at the logic high level for at least a predetermined minimum turn-on time duration (e.g., $T_{on\_min}$). During the predetermined minimum turn-on time duration (e.g., $T_{on\_min}$), the signal 355 remains at the logic high level, even if the signal 382 changes from the logic high level to the logic low level. The signal 355 is received by the NOR gate 374, which also receives the signal 372 and generates a signal 376 based at least in part on the signal 355 and the signal 372. The turn-on controller 2340 receives the signal 382 and the voltage 332 and generates a signal 342 based at least in part on the signal 382 and the voltage 332. The signal 342 is received by the NOR gate 344, which also receives the signal 353 and generates a signal 346 based at least in part on the signal 342 and the signal 353.

As shown in FIG. 3, the signal 346 and the signal 376 are received by the flip-flop 380, which in response generates the signal 382 (e.g., sr) based at least in part on the signal 346 and the signal 376. The flip-flop 380 includes an R terminal, an S terminal, and a QN terminal. The R terminal receives the signal 346, the S terminal receives the signal 376, and the QN terminal outputs the signal 382 (e.g., sr). The signal 382 (e.g., sr) is received by the driver 390.

The driver 390 receives the signal 382 (e.g., sr), generates a voltage 392 (e.g., a drive voltage) based at least in part on the signal 382 (e.g., sr), and sends out the voltage 392 through the terminal 366. For example, if the signal 382 (e.g., sr) is at a logic high level, the voltage 392 (e.g., a drive voltage) is at the logic high level. As an example, if the signal 382 (e.g., sr) is at a logic low level, the voltage 392 (e.g., a drive voltage) is at the logic low level.

In some examples, the controller 360 for synchronous rectification is a part of the flyback power converter 100, and the controller 360 for synchronous rectification is the same as the controller 160 for synchronous rectification. The terminal 362 is the same as the terminal 162, the terminal 364 is the same as the terminal 164, the terminal 366 is the same as the terminal 166, and the terminal 368 is the same as the terminal 168. Additionally, the voltage 332 is the same as the voltage 194, and the voltage 392 is the same as the voltage 196.

In certain examples, the controller 360 for synchronous rectification is a part of the flyback power converter 200, and the controller 360 for synchronous rectification is the same as the controller 260 for synchronous rectification. The terminal 362 is the same as the terminal 262, the terminal 364 is the same as the terminal 264, the terminal 366 is the same as the terminal 266, and the terminal 368 is the same as the terminal 268. Additionally, the voltage 332 is the same as the voltage 294, and the voltage 392 is the same as the voltage 296.

FIG. 4 shows simplified conventional timing diagrams in discontinuous conduction mode (DCM) related to the controller 360 for synchronous rectification as shown in FIG. 3 as part of the flyback power converter 100 as shown in FIG. 1 and/or as part of the flyback power converter 200 as shown in FIG. 2. For example, the waveform 448 represents the voltage 148 as a function of time, the waveform 462 represents a voltage difference from the drain terminal to the source terminal of the transistor 180 as a function of time, and the waveform 492 represents the voltage 196, which is equal to the voltage 392, as a function of time. As an example, the waveform 448 represents the voltage 248 as a function of time, the waveform 462 represents a voltage difference from the drain terminal to the source terminal of the transistor 280 as a function of time, and the waveform 492 represents the voltage 296, which is equal to the voltage 392, as a function of time.

In certain examples, $V_t$ (slp) represents a reference voltage (e.g., equal to 2 V), $V_t$ (off) represents the predetermined threshold voltage (e.g., equal to 0 mV) related to the voltage adjustment component 2370, $V_t$ (reg) represents a reference voltage (e.g., equal to −20 mV), and $V_t$ (on) represents the predetermined threshold voltage (e.g., equal to −200 mV) related to the voltage adjustment component 350. For example, the reference voltage $V_t$ (reg) represents a voltage value that activates a voltage regulation for the voltage difference from the drain terminal to the source terminal of the transistor 180 and/or the voltage difference from the drain terminal to the source terminal of the transistor 280 so that the voltage difference is regulated to remain equal to the reference voltage $V_t$ (reg) (e.g., equal to −20 mV). As an example, $T_s$ represents a time duration for the voltage difference from the drain terminal to the source terminal of the transistor 180 and/or the transistor 280 to decrease from $V_t$ (slp) to $V_t$ (on). In some examples, $V_{out}$ represents the output voltage 172 and/or the output voltage 272. For example, $V_{out}$ ranges from 3 V to 21 V.

For example, if $T_s$ is smaller than a predetermined reference time duration (e.g., $T_{ref}$), the turn-on controller 2340 generates the signal 342 at a logic low level, and if the voltage difference from the drain terminal to the source terminal of the transistor 180 and/or the transistor 280 is smaller than $V_t$ (on), the comparator 352 generates the signal 353 at the logic low level, causing the NOR gate 344 to generate the signal 346 at a logic high level to turn on the transistor 180 and/or the transistor 280. As an example, the predetermined reference time duration (e.g., $T_{ref}$) is equal to 100 ns.

As shown in FIG. 4, in the discontinuous conduction mode (DCM), if the voltage 148 and/or the voltage 248 changes from a logic high level to a logic low level, the transistor 150 (e.g., a MOSFET MS1) and/or the transistor 250 (e.g., a MOSFET MS1) changes from being turned on to being turned off respectively according to some embodiments. In certain examples, when the transistor 150 (e.g., a MOSFET MS1) and/or the transistor 250 (e.g., a MOSFET MS1) becomes turned off, the voltage difference from the drain terminal to the source terminal of the transistor 180 and/or the voltage difference from the drain terminal to the source terminal of the transistor 280 drops from a voltage value 410, passes through the reference voltage $V_t$ (slp) and the predetermined threshold voltage $V_t$ (off), and becomes smaller than the predetermined threshold voltage $V_t$ (on) as shown by the waveform 462. For example, if $T_s$ is smaller than the predetermined reference time duration (e.g., $T_{ref}$), when the voltage difference from the drain terminal to the source terminal of the transistor 180 and/or the voltage difference from the drain terminal to the source terminal of the transistor 280 becomes smaller than $V_t$ (on), the voltage 196 and/or the voltage 296 starts increasing in magnitude. As an example, if $T_s$ is smaller than the predetermined reference time duration (e.g., $T_{ref}$), after the voltage difference from the drain terminal to the source terminal of the transistor 180 and/or the voltage difference from the drain terminal to the source terminal of the transistor 280 becomes smaller than $V_t$ (on), the voltage 196 and/or the voltage 296 increases in magnitude to change from a logic low level to a logic high level, causing the transistor 180 and/or the transistor 280 to changes from being turned off to being turned on.

In certain examples, when the transistor 150 (e.g., a MOSFET MS1) and/or the transistor 250 (e.g., a MOSFET MS1) are turned off, after the transistor 180 (e.g., a MOSFET MS2) and/or the transistor 280 (e.g., a MOSFET MS2) becomes turned on, the current 192 (e.g., $I_{sec}$) and/or the current 292 (e.g., $I_{sec}$) still flows through the body diode 190 (e.g., a parasitic diode of the transistor 180) and/or the body diode 290 (e.g., a parasitic diode of the transistor 280), but the magnitude of the current 192 (e.g., $I_{sec}$) and/or the magnitude of the current 292 (e.g., $I_{sec}$) becomes smaller. For example, after the transistor 180 and/or the transistor 280 becomes turned off, the voltage difference from the drain terminal to the source terminal of the transistor 180 and/or the voltage difference from the drain terminal to the source terminal of the transistor 280 remains negative but the absolute value of the voltage difference becomes smaller. As an example, after the transistor 180 and/or the transistor 280 becomes turned off, the voltage difference from the drain terminal to the source terminal of the transistor 180 and/or the voltage difference from the drain terminal to the source terminal of the transistor 280 remains negative but becomes larger by changing towards zero volts as shown by the waveform 462.

In some examples, after the transistor 180 (e.g., a MOSFET MS2) and/or the transistor 280 (e.g., a MOSFET MS2) becomes turned off, the voltage difference from the drain terminal to the source terminal of the transistor 180 and/or the voltage difference from the drain terminal to the source terminal of the transistor 280 remains negative but also becomes slightly larger than the reference voltage $V_t$ (reg) (e.g., equal to −20 mV). For example, if the voltage difference from the drain terminal to the source terminal of the transistor 180 and/or the voltage difference from the drain terminal to the source terminal of the transistor 280 becomes slightly larger than the reference voltage $V_t$ (reg) (e.g., equal to −20 mV), the voltage 196 and/or the voltage 296 remains at the logic high level but also decreases from a high voltage level in magnitude, causing the on resistance of the transistor 180 (e.g., a MOSFET MS2) and/or the on resistance of the transistor 280 (e.g., a MOSFET MS2) to increase so that the absolute value of the voltage difference becomes larger and the voltage difference becomes approximately equal to the reference voltage $V_t$ (reg) (e.g., equal to −20 mV). As an example, when the magnitude of the current 192 (e.g., $I_{sec}$) and/or the magnitude of the current 292 (e.g., $I_{sec}$) becomes smaller, by reducing the voltage 196 and/or the voltage 296 and thus increasing the on resistance of the transistor 180 and/or the on resistance of the transistor 280, the voltage difference from the drain terminal to the source terminal of the transistor 180 and/or the voltage difference from the drain terminal to the source terminal of the transistor 280 is regulated to remain equal to the reference voltage $V_t$ (reg) (e.g., equal to −20 mV) during a time duration that starts at time $t_j$.

According to certain embodiments, during the time duration, the voltage 196 and/or the voltage 296 decreases from a high voltage value 420 to an intermediate voltage value 430 in magnitude, even though the voltage 196 and/or the voltage 296 remains at the logic high level. For example, at the end of the time duration, the magnitude of the current 192 (e.g., $I_{sec}$) and/or the magnitude of the current 292 (e.g., $I_{sec}$) becomes so small that the on resistance of the transistor 180 and/or the on resistance of the transistor 280 can no longer increase sufficiently to prevent the voltage difference from the drain terminal to the source terminal of the transistor 180 and/or the voltage difference from the drain terminal to the source terminal of the transistor 280 from becoming larger than the reference voltage $V_t$ (reg) (e.g., equal to −20 mV). In some examples, after the end of the time duration, the voltage difference from the drain terminal to the source terminal of the transistor 180 and/or the voltage difference from the drain terminal to the source terminal of the transistor 280 increases and becomes larger than the predetermined threshold voltage $V_t$ (off) (e.g., equal to 0 mV) at time $t_k$. For example, at time $t_k$, the voltage 196 and/or the voltage 296 decreases from the intermediate voltage value 430 to a low voltage value 440, wherein the intermediate voltage value 430 corresponds to the logic high level and the low voltage value 440 corresponds to the logic low level. As an example, at time $t_k$, the voltage 196 and/or the voltage 296 changes from the logic high level to the logic low level, causing the transistor 180 (e.g., a MOSFET MS2) and/or the transistor 280 (e.g., a MOSFET MS2) to change from being turned on to being turned off.

In certain embodiments, the voltage difference from the drain terminal to the source terminal of the transistor 180 and/or the voltage difference from the drain terminal to the source terminal of the transistor 280 is determined as follows:

$$|V_{ds}(t)| = |I_{sec}(t)| \times R_{ds\_on}(t) \quad \text{(Equation 3)}$$

where $|V_{ds}(t)|$ represents the absolute value of the voltage difference from the drain terminal to the source terminal of the transistor 180 and/or the voltage difference from the drain terminal to the source terminal of the transistor 280, and $|I_{sec}(t)|$ represents the absolute value (e.g., the magnitude) of the current 192 (e.g., $I_{sec}$) and/or the absolute value (e.g., the magnitude) of the current 292 (e.g., $I_{sec}$). Additionally, $R_{ds\_on}(t)$ represents the on resistance of the transistor 180 and/or the on resistance of the transistor 280. For example, $|V_{ds}(t)|$, $|I_{sec}(t)|$, and $R_{ds\_on}(t)$ each can change with time.

In some embodiments, during the time duration starting at time $t_j$, the voltage regulation for the voltage difference from the drain terminal to the source terminal of the transistor 180 and/or for the voltage difference from the drain terminal to the source terminal of the transistor 280 is activated. For example, the voltage difference from the drain terminal to the source terminal of the transistor 180 and/or the voltage difference from the drain terminal to the source terminal of the transistor 280 is regulated to remine equal to the reference voltage $V_t$ (reg) (e.g., equal to −20 mV) as shown below.

$$|V_t(\text{reg})| = |I_{sec}(t)| \times R_{ds\_on}(t) \quad \text{(Equation 4)}$$

where $|V_t(\text{reg})|$ represents the absolute value of the reference voltage $V_t$ (reg), and $|I_{sec}(t)|$ represents the absolute value (e.g., the magnitude) of the current 192 (e.g., $I_{sec}$) and/or the absolute value (e.g., the magnitude) of the current 292 (e.g., $I_{sec}$). Additionally, $R_{ds\_on}(t)$ represents the on resistance of the transistor 180 and/or the on resistance of the transistor 280. As an example, $|I_{sec}(t)|$ and $R_{ds\_on}(t)$ each can change with time.

Hence it is highly desirable to improve the synchronous rectification technique.

3. BRIEF SUMMARY OF THE INVENTION

Certain embodiments of the present invention are directed to circuits. More particularly, some embodiments of the invention provide systems and methods for controlling synchronous rectification with variable voltage regulation. Merely by way of example, some embodiments of the invention have been applied to flyback power converters. But it would be recognized that the invention has a much broader range of applicability.

According to some embodiments, a system for controlling synchronous rectification includes: a first controller terminal configured to receive a first input voltage; a second controller terminal biased to a second input voltage; a third controller terminal configured to output an output voltage; a first signal generator configured to generate a logic signal based on at least information associated with the first input voltage; a second signal generator configured to receive the logic signal and generate an adjustment signal based on at least information associated with the logic signal and the first input voltage; and a driver configured to receive the logic signal and the adjustment signal and generate the output voltage based at least in part on the logic signal and the adjustment signal; wherein the first signal generator is further configured to: at a beginning of a first switching cycle of the logic signal, change the logic signal from a first logic level to a second logic level; during the first switching cycle of the logic signal, from the beginning of the first switching cycle of the logic signal to a first time, keep the logic signal at the second logic level; and during the first switching cycle of the logic signal, at the first time, change the logic signal from the second logic level to the first logic level; wherein the second signal generator is further configured to, during a first time duration that starts at the beginning of the first switching cycle of the logic signal: determine a reference voltage equal to a first reference value; and if a voltage difference from the first input voltage to the second input voltage is larger than the first reference value, generate the adjustment signal that is not equal to zero based on at least information associated with the voltage difference and the first reference value; wherein the second signal generator is further configured to, after an end of the first time duration until the first time: determine the reference voltage equal to a second reference value, the second reference value being different from the first reference value; and if the voltage difference from the first input voltage to the second input voltage is larger than the second reference value, generate the adjustment signal that is not equal to zero based on at least information associated with the voltage difference and the second reference value; wherein the driver is configured to, from the beginning of the first switching cycle of the logic signal to the first time, if the adjustment signal is not equal to zero: change the output voltage from a first voltage value to a second voltage value; and keep the output voltage at the second logic level; wherein: the first voltage value corresponds to the second logic level; and the second voltage value corresponds to the second logic level; wherein the voltage difference from the first input voltage to the second input voltage is equal to the first input voltage minus the second input voltage.

According to certain embodiments, a method for controlling synchronous rectification includes: receiving a first input voltage; receiving a second input voltage; generating a logic signal based on at least information associated with the first input voltage; receiving the logic signal; generating an adjustment signal based on at least information associated with the logic signal and the first input voltage; receiving the adjustment signal; and generating the output voltage based at least in part on the logic signal and the adjustment signal; and outputting an output voltage; wherein the generating a logic signal based on at least information associated with the first input voltage includes: at a beginning of a first switching cycle of the logic signal, changing the logic signal from a first logic level to a second logic level; during the first switching cycle of the logic signal, from the beginning of the first switching cycle of the logic signal to a first time, keeping the logic signal at the second logic level; and during the first switching cycle of the logic signal, at the first time, changing the logic signal from the second logic level to the first logic level; wherein the generating an adjustment signal based on at least information associated with the logic signal and the first input voltage includes, during a first time duration that starts at the beginning of the first switching cycle of the logic signal: determining a reference voltage equal to a first reference value; and if a voltage difference from the first input voltage to the second input voltage is larger than the first reference value, generating the adjustment signal that is not equal to zero based on at least information associated with the voltage difference and the first reference value; wherein the generating an adjustment signal based on at least information associated with the logic signal and the first input voltage further includes, after an end of the first time duration until the first time: determining the reference voltage equal to a second reference value, the second reference value being different from the first reference value; and if the voltage difference from the first input voltage to the second input voltage is larger than the second reference value, generating the adjustment signal that is not equal to zero based on at least information associated with the voltage difference and the second reference value; wherein the generating the output voltage based at least in part on the logic signal and the adjustment signal includes, from the beginning of the first switching cycle of the logic signal to the first time, if the adjustment signal is not equal to zero: changing the output voltage from a first voltage value to a second voltage value; and keep the output voltage at the second logic level; wherein: the first voltage value corresponds to the second logic level; and the second voltage value corresponds to the second logic level; wherein the voltage difference from the first input voltage to the second input voltage is equal to the first input voltage minus the second input voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for controlling synchronous rectification with variable voltage regulation. Merely by way of example, some embodiments of the invention have been applied to flyback power converters. But it would be recognized that the invention has a much broader range of applicability.

Figure 1:
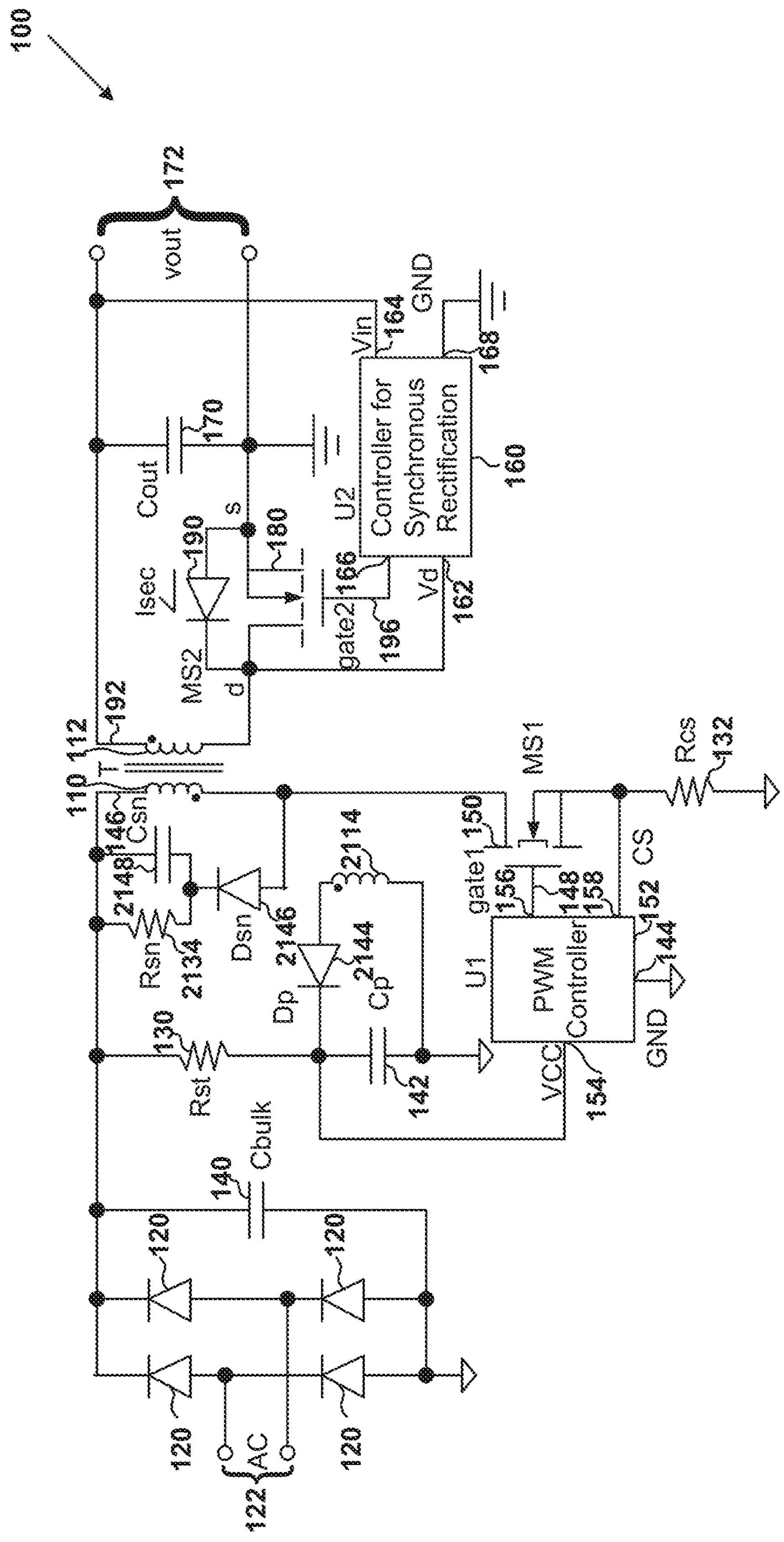
FIG. 1 is a simplified diagram showing a conventional flyback power converter with synchronous rectification.
Figure 2:
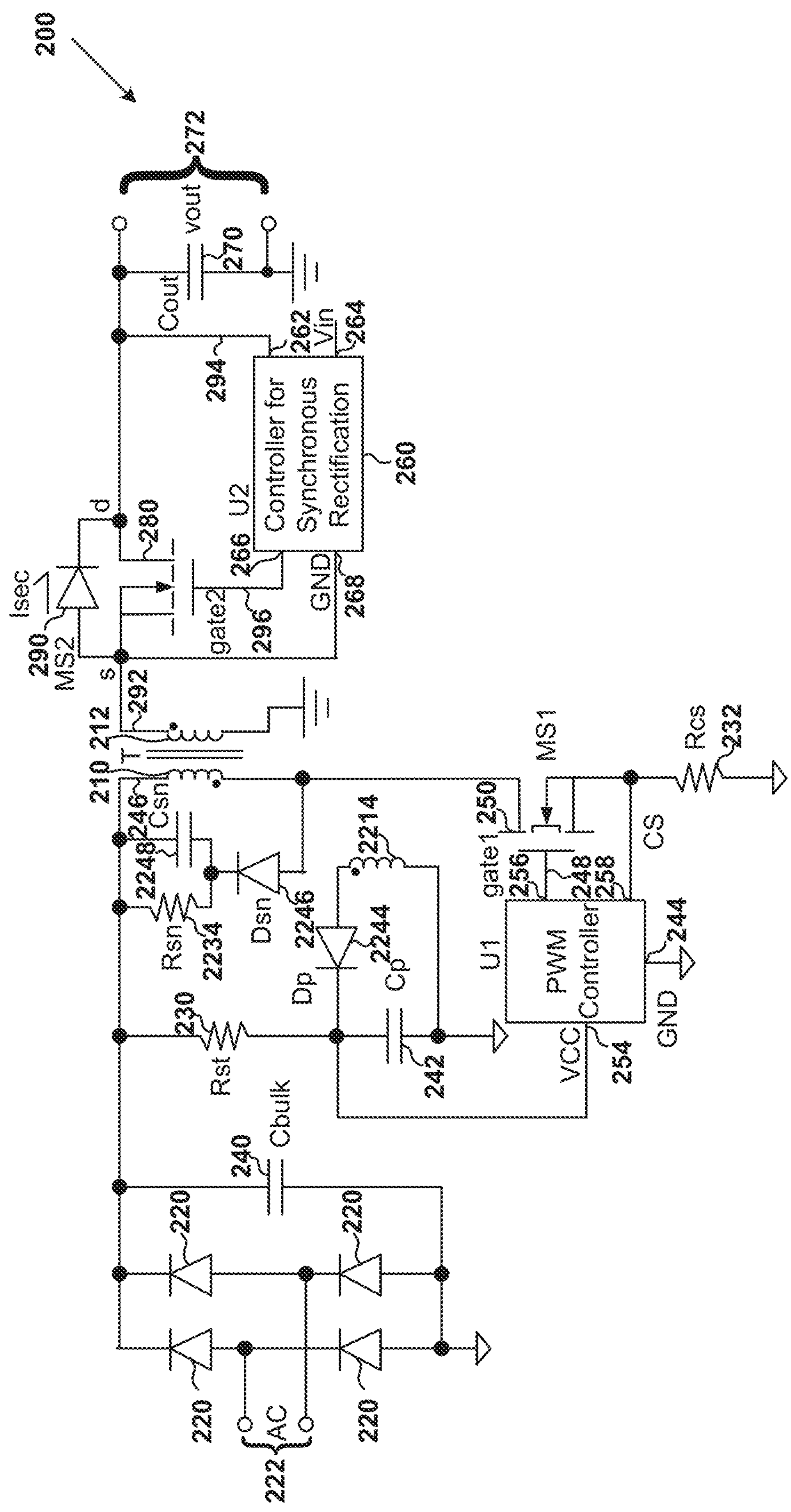
FIG. 2 is a simplified diagram showing another conventional flyback power converter with synchronous rectification.
Figure 3:
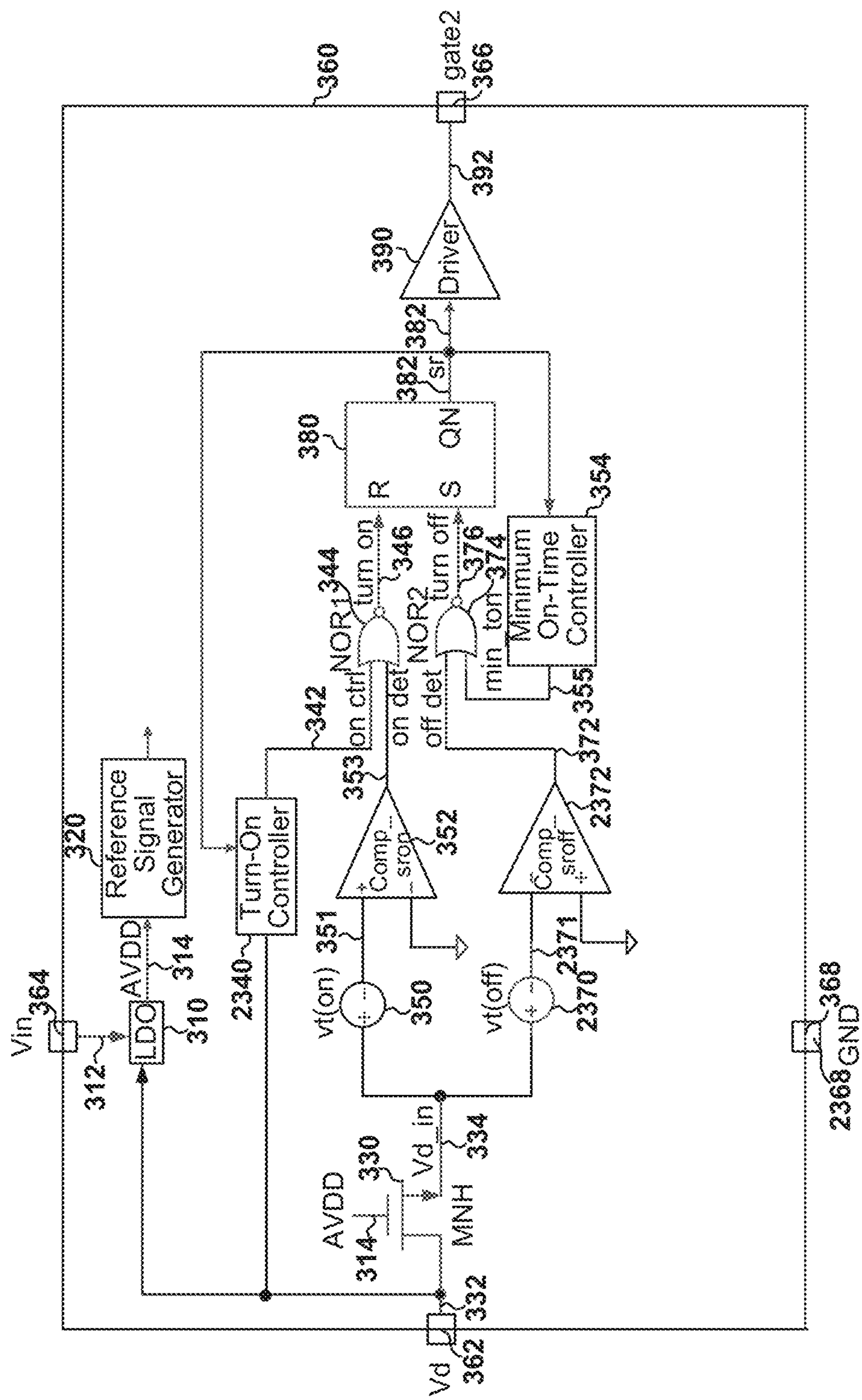
FIG. 3 is a simplified diagram showing a conventional controller for synchronous rectification.
Figure 4:
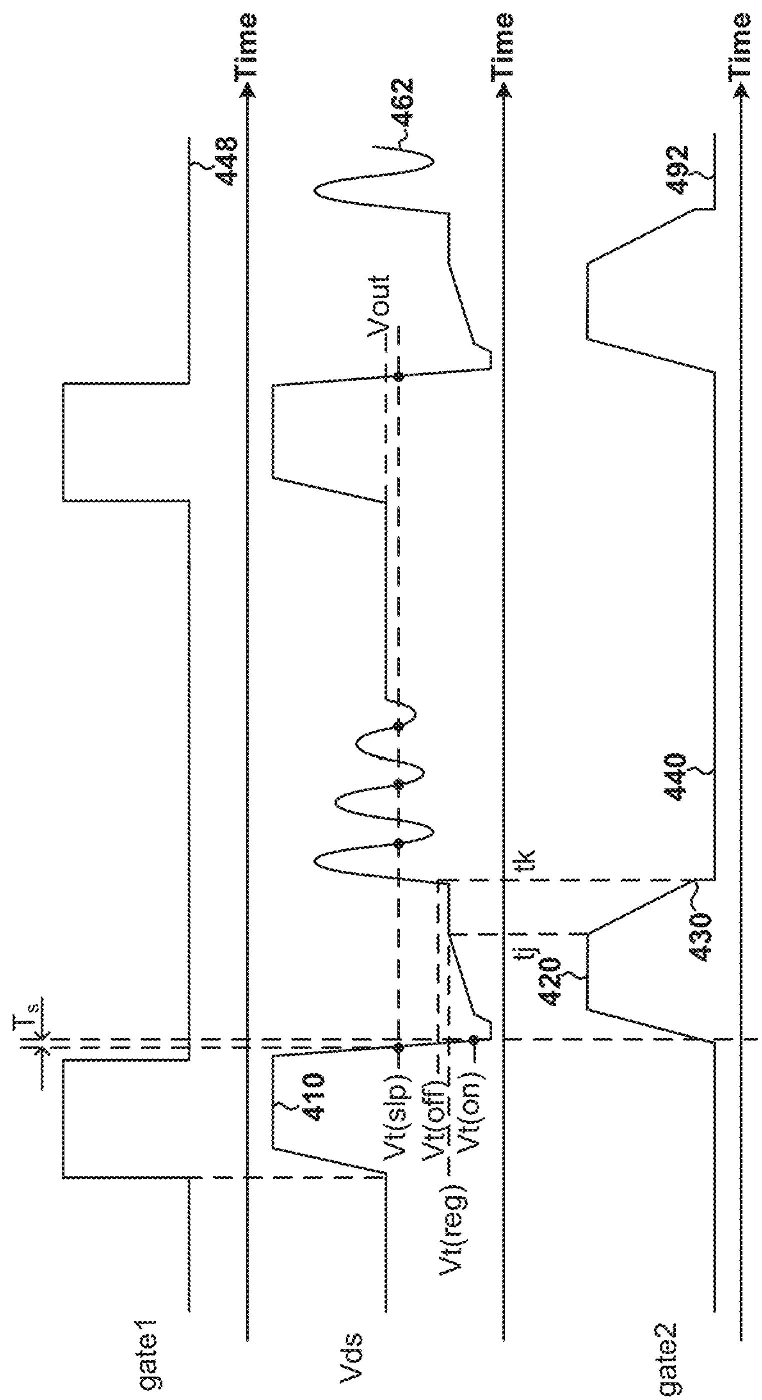
FIG. 4 shows simplified conventional timing diagrams in discontinuous conduction mode (DCM) related to the controller for synchronous rectification as shown in FIG. 3 as part of the flyback power converter as shown in FIG. 1 and/or as part of the flyback power converter as shown in FIG. 2.
Figure 5:
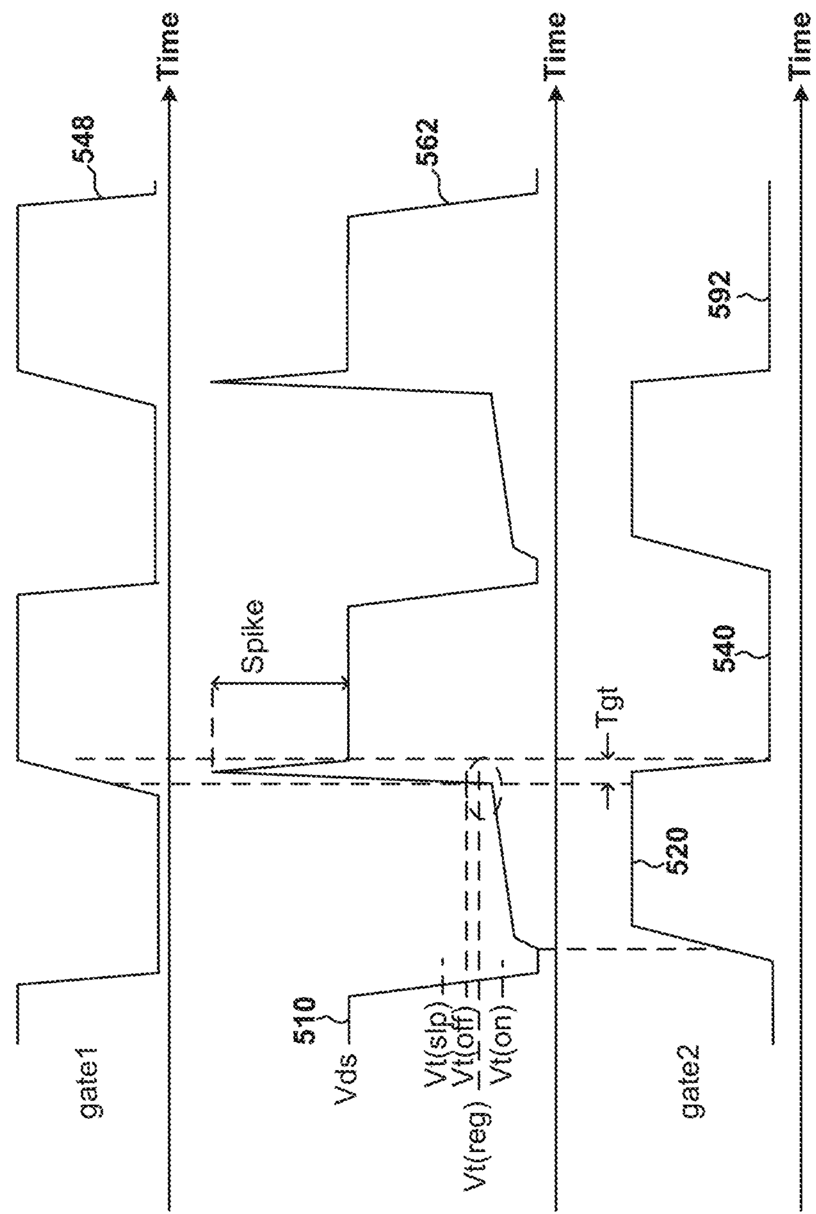
FIG. 5 shows simplified timing diagrams in deep continuous conduction mode (DCCM) related to the controller for synchronous rectification as shown in FIG. 3 as part of the flyback power converter as shown in FIG. 1 and/or as part of the flyback power converter as shown in FIG. 2 according to some embodiments.

FIG. 5 shows simplified timing diagrams in deep continuous conduction mode (DCCM) related to the controller 360 for synchronous rectification as shown in FIG. 3 as part of the flyback power converter 100 as shown in FIG. 1 and/or as part of the flyback power converter 200 as shown in FIG. 2 according to some embodiments. For example, the waveform 548 represents the voltage 148 as a function of time, the waveform 562 represents a voltage difference from the drain terminal to the source terminal of the transistor 180 as a function of time, and the waveform 592 represents the voltage 196, which is equal to the voltage 392, as a function of time. As an example, the waveform 548 represents the voltage 248 as a function of time, the waveform 562 represents a voltage difference from the drain terminal to the source terminal of the transistor 280 as a function of time, and the waveform 592 represents the voltage 296, which is equal to the voltage 392, as a function of time.

In certain examples, $V_t$ (slp) represents a reference voltage (e.g., equal to 2 V), $V_t$ (off) represents the predetermined threshold voltage (e.g., equal to 0 mV) related to the voltage adjustment component 2370, $V_t$ (reg) represents a reference voltage (e.g., equal to −20 mV), and $V_t$ (on) represents the predetermined threshold voltage (e.g., equal to −200 mV) related to the voltage adjustment component 350. In some examples, $T_{gt}$ represents a time duration when the transistor 150 (e.g., a power MOSFET MS1) and the transistor 180 (e.g., a MOSFET MS2) are both turned on and/or when the transistor 250 (e.g., a power MOSFET MS1) and the transistor 280 (e.g., a MOSFET MS2) are both turned on.

As shown in FIG. 5, in the deep continuous conduction mode (DCCM), if the voltage 148 and/or the voltage 248 changes from a logic high level to a logic low level, the transistor 150 (e.g., a MOSFET MS1) and/or the transistor 250 (e.g., a MOSFET MS1) changes from being turned on to being turned off respectively according to some embodiments. In certain examples, when the transistor 150 (e.g., a MOSFET MS1) and/or the transistor 250 (e.g., a MOSFET MS1) becomes turned off, the voltage difference from the drain terminal to the source terminal of the transistor 180 and/or the voltage difference from the drain terminal to the source terminal of the transistor 280 drops from a voltage value 510, passes through the reference voltage $V_t$ (slp) and the predetermined threshold voltage $V_t$ (off), and becomes smaller than the predetermined threshold voltage $V_t$ (on) as shown by the waveform 562. For example, in response, the voltage 196 and/or the voltage 296 increases in magnitude to change from a logic low level to a logic high level, causing the transistor 180 and/or the transistor 280 to changes from being turned off to being turned on.

In some examples, when the transistor 150 (e.g., a MOSFET MS1) and/or the transistor 250 (e.g., a MOSFET MS1) are turned off, after the transistor 180 (e.g., a MOSFET MS2) and/or the transistor 280 (e.g., a MOSFET MS2) becomes turned on, the current 192 (e.g., $I_{sec}$) and/or the current 292 (e.g., $I_{sec}$) still flows through the body diode 190 (e.g., a parasitic diode of the transistor 180) and/or the body diode 290 (e.g., a parasitic diode of the transistor 280), but the magnitude of the current 192 (e.g., $I_{sec}$) and/or the magnitude of the current 292 (e.g., $I_{sec}$) becomes smaller. For example, after the transistor 180 and/or the transistor 280 becomes turned off, the voltage difference from the drain terminal to the source terminal of the transistor 180 and/or the voltage difference from the drain terminal to the source terminal of the transistor 280 remains negative but the absolute value of the voltage difference becomes smaller. As an example, after the transistor 180 and/or the transistor 280 becomes turned off, the voltage difference from the drain terminal to the source terminal of the transistor 180 and/or the voltage difference from the drain terminal to the source terminal of the transistor 280 remains negative but becomes larger by changing towards zero volts as shown by the waveform 562.

According to certain embodiments, in the deep continuous conduction mode (DCCM), if the voltage 148 and/or the voltage 248 change from a logic low level to a logic high level, the transistor 150 (e.g., a power MOSFET MS1) and/or the transistor 250 (e.g., a power MOSFET MS1) changes from being turned off to being turned on. For example, when the transistor 150 (e.g., a power MOSFET MS1) and/or the transistor 250 (e.g., a power MOSFET MS1) changes from being turned off to being turned on, the transistor 180 (e.g., a MOSFET MS2) and/or the transistor 280 (e.g., a MOSFET MS2) are still turned on. As an example, when the transistor 150 (e.g., a power MOSFET MS1) and/or the transistor 250 (e.g., a power MOSFET MS1) changes from being turned off to being turned on, the voltage difference from the drain terminal to the source terminal of the transistor 180 and/or the voltage difference from the drain terminal to the source terminal of the transistor 280 are smaller than the reference voltage $V_t$ (reg) (e.g., equal to −20 mV), and the voltage regulation for the voltage difference from the drain terminal to the source terminal of the transistor 180 and/or for the voltage difference from the drain terminal to the source terminal of the transistor 280 is not activated, so the voltage 196 and/or the voltage 296 remains at a high voltage value 520 in magnitude.

In some examples, when the transistor 150 (e.g., a power MOSFET MS1) and the transistor 180 (e.g., a MOSFET MS2) are both turned on and/or the transistor 250 (e.g., a power MOSFET MS1) and the transistor 280 (e.g., a MOSFET MS2) are both turned on, the voltage difference from the drain terminal to the source terminal of the transistor 180 and/or the voltage difference from the drain terminal to the source terminal of the transistor 280 increases rapidly. For example, if the voltage difference from the drain terminal to the source terminal of the transistor 180 and/or the voltage difference from the drain terminal to the source terminal of the transistor 280 becomes larger than the predetermined threshold voltage $V_t$ (off) (e.g., equal to 0 mV), the voltage 196 and/or the voltage 296 changes from the logic high level to the logic low level, causing the transistor 180 (e.g., a MOSFET MS2) and/or the transistor 280 (e.g., a MOSFET MS2) to become turned off.

In certain examples, without activating the voltage regulation for the voltage difference from the drain terminal to the source terminal of the transistor 180 and/or for the voltage difference from the drain terminal to the source terminal of the transistor 280, the transistor 180 (e.g., a MOSFET MS2) and/or the transistor 280 (e.g., a MOSFET MS2) changes slowly from being turned on to being turned off, allowing the voltage difference from the drain terminal to the source terminal of the transistor 180 and/or the voltage difference from the drain terminal to the source terminal of the transistor 280 to form a spike as shown by the waveform 562. For example, the spike causes damage to the transistor 180 (e.g., a MOSFET MS2) and/or the transistor 280 (e.g., a MOSFET MS2).

In some embodiments, in the deep continuous conduction mode (DCCM), with the transistor 180 (e.g., a MOSFET MS2) and/or the transistor 280 (e.g., a MOSFET MS2) being turned on, when the transistor 150 (e.g., a power MOSFET MS1) and/or the transistor 250 (e.g., a power MOSFET MS1) changes from being turned off to being turned on, the voltage difference from the drain terminal to the source terminal of the transistor 180 and/or the voltage difference from the drain terminal to the source terminal of the transistor 280 are smaller than the reference voltage $V_t$ (reg) (e.g., equal to −20 mV). For example, the voltage regulation for the voltage difference from the drain terminal to the source terminal of the transistor 180 and/or for the voltage difference from the drain terminal to the source terminal of the transistor 280 is not activated, and the voltage 196 and/or the voltage 296 remains at the high voltage value 520 that corresponds to the logic high level. In some examples, after the voltage difference from the drain terminal to the source terminal of the transistor 180 and/or the voltage difference from the drain terminal to the source terminal of the transistor 280 becomes larger than the predetermined threshold voltage $V_t$ (off) (e.g., equal to 0 mV), the transistor 180 (e.g., a MOSFET MS2) and/or the transistor 280 (e.g., a MOSFET MS2) changes from being turned on to being turned off.

In certain examples, the voltage regulation for the voltage difference from the drain terminal to the source terminal of the transistor 180 and/or for the voltage difference from the drain terminal to the source terminal of the transistor 280 is not activated, so the voltage 196 and/or the voltage 296 are not pulled down from the high voltage value 520 to an intermediate voltage level that still corresponds to the logic high level before the voltage 196 and/or the voltage 296 changes from the logic high level to the logic low level. For example, if the voltage 196 and/or the voltage 296 are not pulled down to an intermediate voltage level that still corresponds to the logic high level before the voltage 196 and/or the voltage 296 changes from the logic high level to the logic low level, it takes a longer time for the voltage 196 and/or the voltage 296 to decrease from the high voltage value 520 to a low voltage value 540, wherein the high voltage value 520 corresponds to the logic high level and the low voltage value 540 corresponds to the logic low level. As an example, the voltage 196 and/or the voltage 296 change slowly from the logic high level to the logic low level, so when the transistor 150 (e.g., a power MOSFET MS1) and the transistor 180 (e.g., a MOSFET MS2) are both turned on and/or the transistor 250 (e.g., a power MOSFET MS1) and the transistor 280 (e.g., a MOSFET MS2) are both turned on, the voltage difference from the drain terminal to the source terminal of the transistor 180 and/or the voltage difference from the drain terminal to the source terminal of the transistor 280 forms a spike as shown by the waveform 562.

Figure 6:
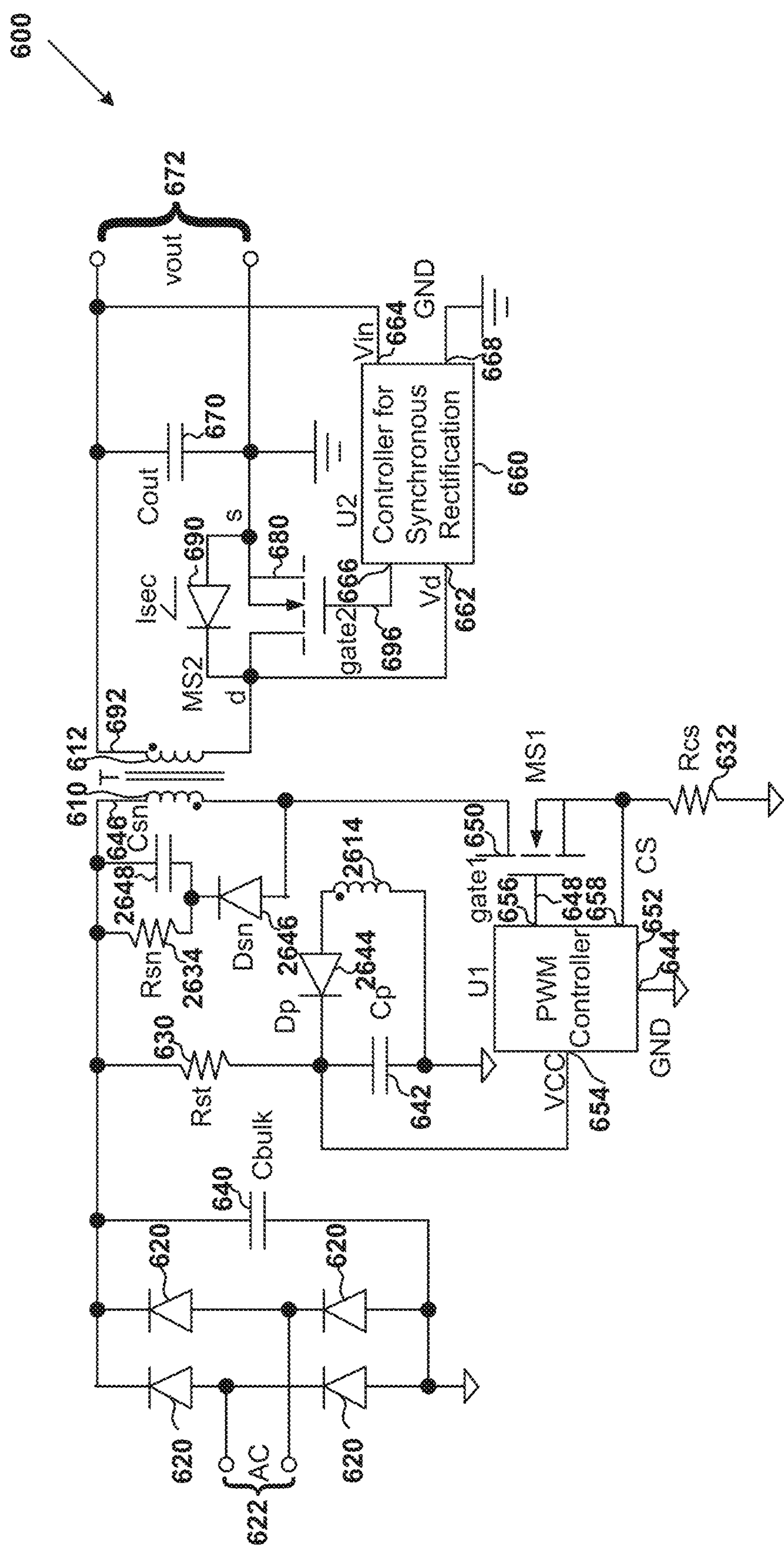
FIG. 6 is a simplified diagram showing a flyback power converter with synchronous rectification according to certain embodiments of the present invention.

FIG. 6 is a simplified diagram showing a flyback power converter with synchronous rectification according to certain embodiments of the present invention. This diagram is merely an example, which should not unduly limit the scope of the claims. One of ordinary skill in the art would recognize many variations, alternatives, and modifications. As shown in FIG. 6, the flyback power converter 600 includes a primary winding 610, a secondary winding 612, and an auxiliary winding 2614, all of which are parts of a transformer (e.g., a transformer T). On the primary side, the flyback power converter 600 also includes a bridge rectifier 620 (e.g., a rectifier that includes four diodes), a resistor 630 (e.g., $R_{st}$), a resistor 632 (e.g., $R_{cs}$), a capacitor 640 (e.g., $C_{bulk}$), a capacitor 642 (e.g., $C_p$), a transistor 650 (e.g., a power MOSFET MS1), a pulse-width-modulation controller 652 (e.g., a controller chip U1), a resistor 2634 (e.g., $R_{sn}$), a diode 2644 (e.g., $D_p$), a diode 2646 (e.g., $D_{sn}$), and a capacitor 2648 (e.g., $C_{sn}$). For example, the resistor 2634 (e.g., $R_{sn}$), the diode 2646 (e.g., $D_{sn}$), and the capacitor 2648 (e.g., $C_{sn}$) are parts of a Resistor-Capacitor-Diode (RCD) claim circuit. Additionally, on the secondary side, the flyback power converter 600 also includes a controller 660 for synchronous rectification (e.g., a controller chip U2), a capacitor 670 (e.g., $C_{out}$), a transistor 680 (e.g., a MOSFET MS2), and a body diode 690 (e.g., a parasitic diode of the transistor 680). Although the above has been shown using a selected group of components for the flyback power converter 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 6, an alternating current (AC) input voltage 622 is rectified by the bridge rectifier 620 and then filtered by the capacitor 640 (e.g., $C_{bulk}$) according to some embodiments. In some examples, one terminal of the capacitor 640 (e.g., $C_{bulk}$) is connected to one terminal of the resistor 630 (e.g., $R_{st}$) and one terminal of the primary winding 610. For example, the one terminal of the primary winding 610 is connected to one terminal of the resistor 2634 (e.g., $R_{sn}$) and one terminal of the capacitor 2648 (e.g., $C_{sn}$). As an example, another terminal of the resistor 2634 (e.g., $R_{sn}$) and another terminal of the capacitor 2648 (e.g., $C_{sn}$) are connected to one terminal of the diode 2646 (e.g., $D_{sn}$). In certain examples, another terminal of the primary winding 610 is connected to another terminal of the diode 2646 (e.g., $D_{sn}$) and the drain terminal of the transistor 650 (e.g., a MOSFET MS1). For example, another terminal of the resistor 630 (e.g., $R_{st}$) is connected to one terminal of the capacitor 642 (e.g., $C_p$), one terminal of the diode 2644 (e.g., $D_p$), and a terminal 654 (e.g., VCC) of the pulse-width-modulation controller 652 (e.g., the controller chip U1). As an example, another terminal of the diode 2644 (e.g., $D_p$) is connected to one terminal of the auxiliary winding 2614. For example, another terminal of the capacitor 642 (e.g., $C_p$) and another terminal of the auxiliary winding 2614 are biased to the ground voltage on the primary side.

In certain embodiments, a terminal 656 (e.g., gate1) of the pulse-width-modulation controller 652 (e.g., the controller chip U1) is connected to the gate terminal of the transistor 650 (e.g., a MOSFET MS1). In some examples, the pulse-width-modulation controller 652 (e.g., the controller chip U1) outputs a voltage 648 through the terminal 656 (e.g., gate1) to the gate terminal of the transistor 650 (e.g., a MOSFET MS1). For example, a terminal 658 (e.g., CS) of the pulse-width-modulation controller 652 (e.g., the controller chip U1) is connected to the source terminal of the transistor 650 (e.g., a MOSFET MS1) and is also connected to one terminal of the resistor 632 (e.g., $R_{cs}$). As an example, another terminal of the resistor 632 (e.g., $R_{cs}$) and a terminal 644 (e.g., GND) of the pulse-width-modulation controller 652 (e.g., the controller chip U1) both are biased to the ground voltage on the primary side.

In some embodiments, one terminal of the secondary winding 612 is connected to the cathode of the body diode 690, the drain terminal of the transistor 680 (e.g., a MOSFET MS2), and a terminal 662 (e.g., $V_d$) of the controller 660 for synchronous rectification (e.g., the controller chip U2). In certain examples, another terminal of the secondary winding 612 is connected to one terminal of the capacitor 670 (e.g., $C_{out}$) and is also connected to a terminal 664 (e.g., $V_{in}$) of the controller 660 for synchronous rectification (e.g., the controller chip U2). For example, the source terminal of the transistor 680 (e.g., a MOSFET MS2) is connected to the anode of the body diode 690, and the gate terminal of the transistor 680 (e.g., a MOSFET MS2) is connected to a terminal 666 (e.g., gate2) of the controller 660 for synchronous rectification (e.g., the controller chip U2). As an example, another terminal of the capacitor 670 (e.g., $C_{out}$), the source terminal of the transistor 680 (e.g., a MOSFET MS2), and a terminal 668 (e.g., GND) of the controller 660 for synchronous rectification (e.g., the controller chip U2) all are biased to the ground voltage on the secondary side. In some examples, the output voltage 672 (e.g., $V_{out}$) represents the voltage drop between the two terminals of the capacitor 670 (e.g., $C_{out}$). For example, as shown in FIG. 6, a current 646 flows through the primary winding 610, and a current 692 (e.g., $I_{sec}$) flows through the secondary winding 612. As an example, the controller 660 for synchronous rectification (e.g., the controller chip U2) receives a voltage 694 through the terminal 662 (e.g., $V_d$) from the drain terminal of the transistor 680 (e.g., a MOSFET MS2), and outputs a voltage 696 through the terminal 666 (e.g., gate2) to the gate terminal of the transistor 680 (e.g., a MOSFET MS2).

Figure 8:
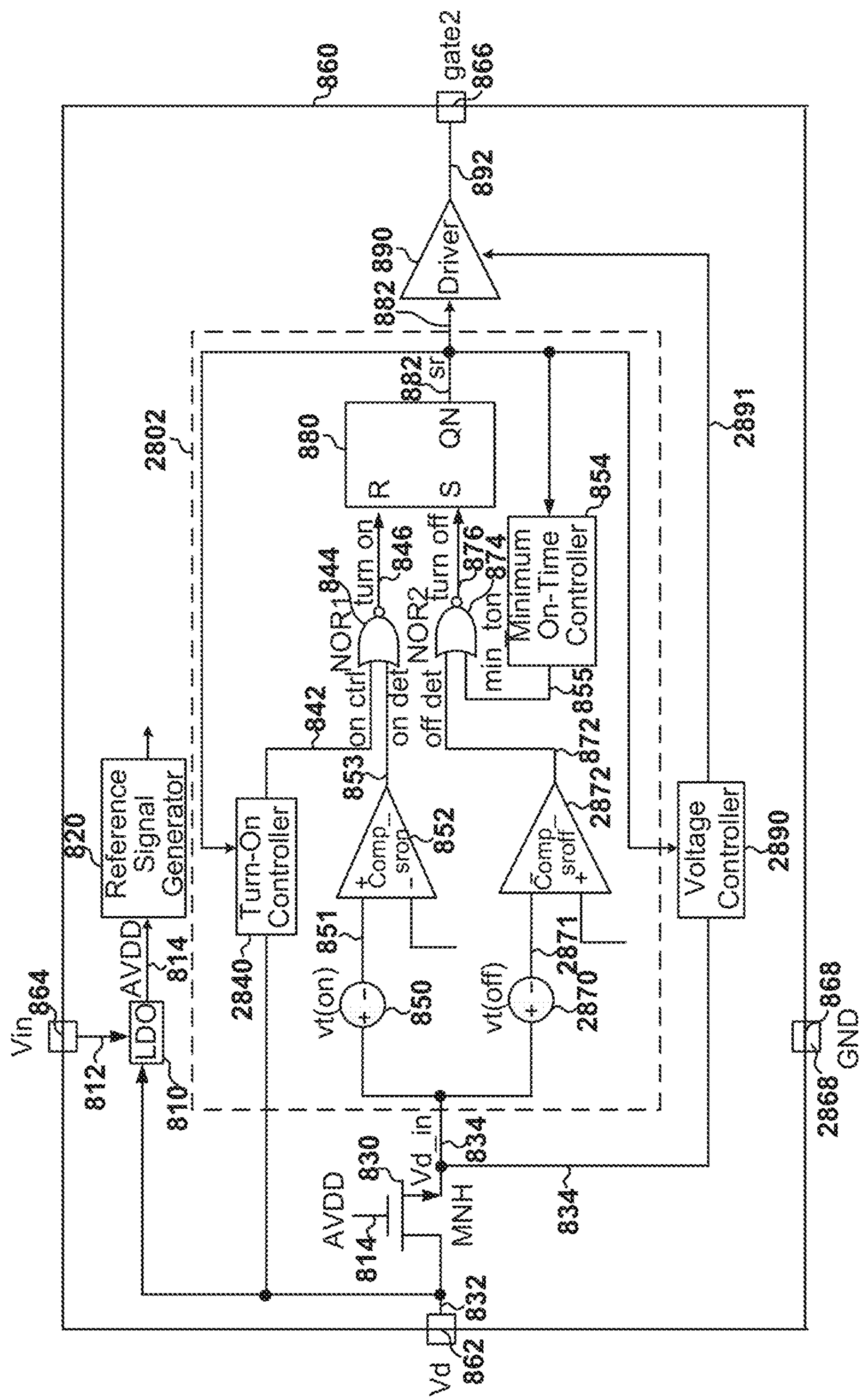
FIG. 8 is a simplified diagram showing a controller for synchronous rectification according to certain embodiments of the present invention.

According to certain embodiments, for the flyback power converter 600, the controller 660 for synchronous rectification (e.g., the controller chip U2) and the transistor 680 (e.g., a MOSFET MS2) are parts of a synchronous rectification system (e.g., a synchronous rectifier). According to some embodiments, the controller 660 for synchronous rectification performs variable voltage regulation for the voltage difference from a voltage at the terminal 662 (e.g., $V_d$) to a voltage at the terminal 668 (e.g., GND). For example, the controller 660 for synchronous rectification is implemented as the controller 860 for synchronous rectification as shown in FIG. 8.

Figure 7:
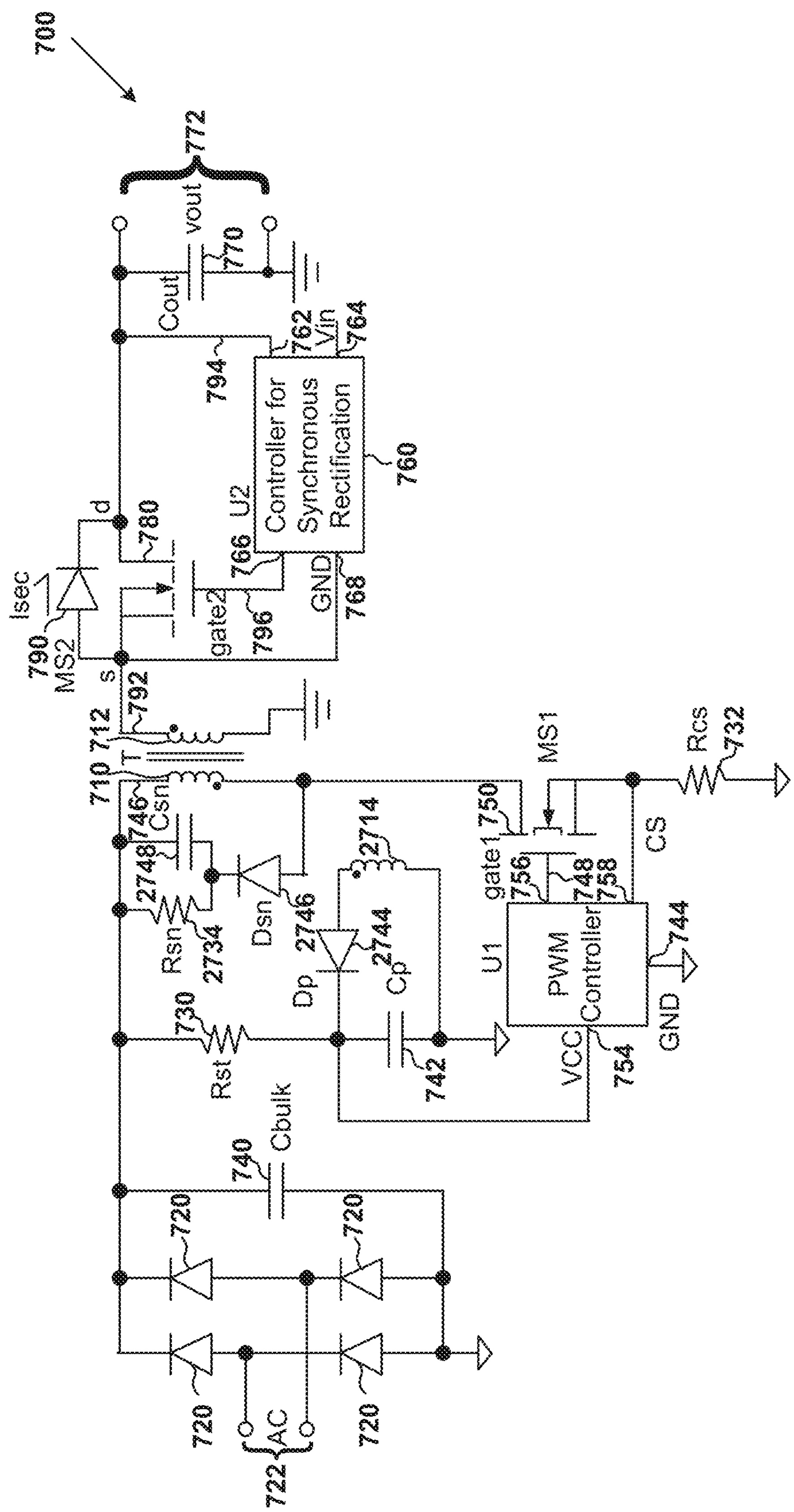
FIG. 7 is a simplified diagram showing a flyback power converter with synchronous rectification according to some embodiments of the present invention.

FIG. 7 is a simplified diagram showing a flyback power converter with synchronous rectification according to some embodiments of the present invention. This diagram is merely an example, which should not unduly limit the scope of the claims. One of ordinary skill in the art would recognize many variations, alternatives, and modifications. As shown in FIG. 7, the flyback power converter 700 includes a primary winding 710, a secondary winding 712, and an auxiliary winding 2714, all of which are parts of a transformer (e.g., a transformer T). On the primary side, the flyback power converter 700 also includes a bridge rectifier 720 (e.g., a rectifier that includes four diodes), a resistor 730 (e.g., $R_{st}$), a resistor 732 (e.g., $R_{cs}$), a capacitor 740 (e.g., $C_{bulk}$), a capacitor 742 (e.g., $C_p$), a transistor 750 (e.g., a power MOSFET MS1), a pulse-width-modulation controller 752 (e.g., a controller chip U1), a resistor 2734 (e.g., $R_{sn}$), a diode 2744 (e.g., $D_p$), a diode 2746 (e.g., $D_{sn}$), and a capacitor 2748 (e.g., $C_{sn}$). For example, the resistor 2734 (e.g., $R_{sn}$), the diode 2746 (e.g., $D_{sn}$), and the capacitor 2748 (e.g., $C_{sn}$) are parts of a Resistor-Capacitor-Diode (RCD) claim circuit. Additionally, on the secondary side, the flyback power converter 700 also includes a controller 760 for synchronous rectification (e.g., a controller chip U2), a capacitor 770 (e.g., $C_{out}$), a transistor 780 (e.g., a MOSFET MS2), and a body diode 790 (e.g., a parasitic diode of the transistor 780).

As shown in FIG. 7, an alternating current (AC) input voltage 722 is rectified by the bridge rectifier 720 and then filtered by the capacitor 740 (e.g., $C_{bulk}$) according to certain embodiments. In some examples, one terminal of the capacitor 740 (e.g., $C_{bulk}$) is connected to one terminal of the resistor 730 (e.g., $R_{st}$) and one terminal of the primary winding 710. For example, the one terminal of the primary winding 710 is connected to one terminal of the resistor 2734 (e.g., $R_{sn}$) and one terminal of the capacitor 2748 (e.g., $C_{sn}$). As an example, another terminal of the resistor 2734 (e.g., $R_{sn}$) and another terminal of the capacitor 2748 (e.g., $C_{sn}$) are connected to one terminal of the diode 2746 (e.g., $D_{sn}$). In certain examples, another terminal of the primary winding 710 is connected to another terminal of the diode 2746 (e.g., $D_{sn}$) and the drain terminal of the transistor 750 (e.g., a MOSFET MS1). For example, another terminal of the resistor 730 (e.g., $R_{st}$) is connected to one terminal of the capacitor 742 (e.g., $C_p$), one terminal of the diode 2744 (e.g., $D_p$), and a terminal 754 (e.g., VCC) of the pulse-width-modulation controller 752 (e.g., the controller chip U1). As an example, another terminal of the diode 2744 (e.g., $D_p$) is connected to one terminal of the auxiliary winding 2714. For example, another terminal of the capacitor 742 (e.g., $C_p$) and another terminal of the auxiliary winding 2714 are biased to the ground voltage on the primary side.

According to some embodiments, a terminal 756 (e.g., gate1) of the pulse-width-modulation controller 752 (e.g., the controller chip U1) is connected to the gate terminal of the transistor 750 (e.g., a MOSFET MS1). In certain examples, the pulse-width-modulation controller 752 (e.g., the controller chip U1) outputs a voltage 748 through the terminal 756 (e.g., gate1) to the gate terminal of the transistor 750 (e.g., a MOSFET MS1). For example, a terminal 758 (e.g., CS) of the pulse-width-modulation controller 752 (e.g., the controller chip U1) is connected to the source terminal of the transistor 750 (e.g., a MOSFET MS1) and is also connected to one terminal of the resistor 732 (e.g., $R_{cs}$). As an example, another terminal of the resistor 732 (e.g., $R_{cs}$) and a terminal 744 (e.g., GND) of the pulse-width-modulation controller 752 (e.g., the controller chip U1) both are biased to the ground voltage on the primary side.

In certain embodiments, one terminal of the secondary winding 712 is connected to the anode of the body diode 790, the source terminal of the transistor 780 (e.g., a MOSFET MS2), and a terminal 768 (e.g., GND) of the controller 760 for synchronous rectification (e.g., the controller chip U2). In some examples, another terminal of the secondary winding 712 is biased to the ground voltage on the secondary side. For example, the gate terminal of the transistor 780 (e.g., a MOSFET MS2) is connected to a terminal 766 (e.g., gate2) of the controller 760 for synchronous rectification (e.g., the controller chip U2). As an example, the drain terminal of the transistor 780 (e.g., a MOSFET MS2) is connected to the cathode of the body diode 790, a terminal 762 (e.g., $V_d$) of the controller 760 for synchronous rectification (e.g., the controller chip U2), and one terminal of the capacitor 770 (e.g., $C_{out}$). In certain examples, another terminal of the capacitor 770 (e.g., $C_{out}$) is biased to the ground voltage on the secondary side. For example, the output voltage 772 (e.g., $V_{out}$) represents the voltage drop between the two terminals of the capacitor 770 (e.g., $C_{out}$). As an example, a terminal 764 (e.g., $V_{in}$) of the controller 760 for synchronous rectification (e.g., the controller chip U2) is not biased (e.g., floating electrically).

In some embodiments, also as shown in FIG. 7, a current 746 flows through the primary winding 710, and a current 792 (e.g., $I_{sec}$) flows through the secondary winding 712. For example, the controller 760 for synchronous rectification (e.g., the controller chip U2) receives a voltage 794 through the terminal 762 (e.g., $V_d$) from the drain terminal of the transistor 780 (e.g., a MOSFET MS2), and outputs a voltage 796 through the terminal 766 (e.g., gate2) to the gate terminal of the transistor 780 (e.g., a MOSFET MS2).

According to certain embodiments, the controller 760 for synchronous rectification performs variable voltage regulation for the voltage difference from a voltage at the terminal 762 (e.g., $V_d$) to a voltage at the terminal 768 (e.g., GND). For example, the controller 760 for synchronous rectification is implemented as the controller 860 for synchronous rectification as shown in FIG. 8.

FIG. 8 is a simplified diagram showing a controller 860 for synchronous rectification according to certain embodiments of the present invention. This diagram is merely an example, which should not unduly limit the scope of the claims. One of ordinary skill in the art would recognize many variations, alternatives, and modifications. The controller 860 for synchronous rectification includes a terminal 862 (e.g., $V_d$), a terminal 864 (e.g., $V_{in}$), a terminal 866 (e.g., gate2), and a terminal 868 (e.g., GND). As shown in FIG. 8, the controller 860 for synchronous rectification also includes a low-dropout regulator 810, a reference signal generator 820, a switch 830 (e.g., a transistor), a NOR gate 844, a voltage adjustment component 850, a comparator 852, a minimum on-time controller 854, a NOR gate 874, a flip-flop 880, a driver 890, a voltage adjustment component 2870, a comparator 2872, a turn-on controller 2840, and a voltage controller 2890. Although the above has been shown using a selected group of components for the controller 860 for synchronous rectification, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the controller 860 for synchronous rectification is used as the controller 660 for synchronous rectification of the flyback power converter 600. In certain examples, the terminal 862 (e.g., $V_d$) is used as the terminal 662 (e.g., $V_d$), the terminal 864 (e.g., $V_{in}$) is used as the terminal 664 (e.g., $V_{in}$), the terminal 866 (e.g., gate2) is used as the terminal 666 (e.g., gate2), and the terminal 868 (e.g., GND) is used as the terminal 668 (e.g., GND). In some examples, the terminal 862 (e.g., $V_d$) receives a voltage 832 that is the same as the drain voltage of the transistor 680 (e.g., a MOSFET MS2), and the terminal 868 (e.g., GND) is biased to the ground voltage on the secondary side of the flyback power converter 600. For example, a voltage difference from the voltage 832 at the terminal 862 (e.g., $V_d$) to a voltage 2868 (e.g., the ground voltage) at the terminal 868 (e.g., GND) is the same as a voltage difference from the drain terminal to the source terminal of the transistor 680 (e.g., a MOSFET MS2). As an example, the voltage difference from the voltage 832 at the terminal 862 (e.g., $V_d$) to the voltage 2868 (e.g., the ground voltage) at the terminal 868 (e.g., GND) is equal to the voltage 832 at the terminal 862 (e.g., $V_d$) minus the voltage 2868 (e.g., the ground voltage) at the terminal 868 (e.g., GND), and the voltage difference from the drain terminal to the source terminal of the transistor 680 (e.g., a MOSFET MS2) is equal to the drain voltage at the drain terminal minus the source voltage at the source terminal of the transistor 680 (e.g., a MOSFET MS2).

In certain embodiments, the controller 860 for synchronous rectification is used as the controller 760 for synchronous rectification of the flyback power converter 700. In some examples, the terminal 862 (e.g., $V_d$) is used as the terminal 762 (e.g., $V_d$), the terminal 864 (e.g., $V_{in}$) is used as the terminal 764 (e.g., $V_{in}$), the terminal 866 (e.g., gate2) is used as the terminal 766 (e.g., gate2), and the terminal 868 (e.g., GND) is used as the terminal 768 (e.g., GND). In certain examples, the terminal 862 (e.g., $V_d$) receives the voltage 832 that is the same as the drain voltage of the transistor 780 (e.g., a MOSFET MS2), and the terminal 868 (e.g., GND) is connected to the source terminal of the transistor 780 (e.g., a MOSFET MS2). For example, a voltage difference from the voltage 832 at the terminal 862 (e.g., $V_d$) to the voltage 2868 at the terminal 868 (e.g., GND) is the same as a voltage difference from the drain terminal to the source terminal of the transistor 780 (e.g., a MOSFET MS2). As an example, the voltage difference from the voltage 832 at the terminal 862 (e.g., $V_d$) to the voltage 2868 (e.g., the ground voltage) at the terminal 868 (e.g., GND) is equal to the voltage 832 at the terminal 862 (e.g., $V_d$) minus the voltage 2868 (e.g., the ground voltage) at the terminal 868 (e.g., GND), and the voltage difference from the drain terminal to the source terminal of the transistor 780 (e.g., a MOSFET MS2) is equal to the drain voltage at the drain terminal minus the source voltage at the source terminal of the transistor 780 (e.g., a MOSFET MS2).

As shown in FIG. 8, the low-dropout regulator 810 receives an input voltage 812 through the terminal 864 and the voltage 832 through the terminal 862 and generates a supply voltage 814 (e.g., AVDD) based at least in part on the input voltage 812 and/or the voltage 832 according to some embodiments. For example, if the terminal 864 is not biased (e.g., floating electrically), the low-dropout regulator 810 generates the supply voltage 814 (e.g., AVDD) based at least in part on the voltage 832. In certain examples, the supply voltage 814 is received by the reference signal generator 820, which in response generates one or more predetermined reference voltages (e.g., $V_{ref}$) and/or one or more predetermined reference currents (e.g., $I_{ref}$). In some examples, the supply voltage 814 is also received by the gate terminal of the transistor 830 (e.g., a high-voltage transistor). For example, the drain terminal of the transistor 830 receives the voltage 832 through the terminal 862, and the source terminal of the transistor 830 is biased at a voltage 834. As an example, if the transistor 830 is turned on by the supply voltage 814, the voltage 834 is equal to the voltage 832. For example, the voltage 834 is received by the voltage adjustment component 850 and the voltage adjustment component 2870.

According to certain embodiments, the voltage adjustment component 850 receives the voltage 834 and generates a voltage 851 based at least in part on the voltage 834. For example, the voltage 851 is equal to the voltage 834 minus a predetermined threshold voltage (e.g., $V_t$ (on)), and the predetermined threshold voltage (e.g., $V_t$ (on)) is negative. As an example, if the transistor 830 is turned on, $$V_{851}=V_{832}-V_t\text{ (on)} \quad \text{(Equation 5)}$$

where $V_{851}$ represents the voltage 851, and $V_{832}$ represents the voltage 832. Additionally, $V_t$ (on) represents the predetermined threshold voltage, which has a negative value.

As shown in FIG. 8, the voltage 851 is received by the non-inverting input terminal (e.g., the "+" input terminal) of the comparator 852, which also includes an inverting input terminal (e.g., the "−" input terminal) according to some embodiments. In certain examples, the inverting input terminal of the comparator 852 is biased to the voltage 2868 at the terminal 868 (e.g., GND). For example, based at least in part on the voltage 851 received by the non-inverting input terminal and the voltage 2868 at the terminal 868 (e.g., GND) received by the inverting input terminal, the comparator 852 generates a signal 853. As an example, the signal 853 is at a logic high level if the voltage 851 is higher than the ground voltage, and the signal 853 is at a logic low level if the voltage 851 is lower than the ground voltage. According to certain embodiments, referring to Equation 5, when the transistor 830 is turned on, if the voltage 832 is larger than the predetermined threshold voltage (e.g., $V_t$ (on)), the signal 853 (e.g., on det) is at the logic high level, and if the voltage 832 is smaller than the predetermined threshold voltage (e.g., $V_t$ (on)), the signal 853 (e.g., on det) is at the logic low level. In some examples, the signal 853 (e.g., on det) is received by the NOR gate 844.

According to certain embodiments, the voltage adjustment component 2870 receives the voltage 834 and generates a voltage 2871 based at least in part on the voltage 834. For example, the voltage 2871 is equal to the voltage 834 minus a predetermined threshold voltage (e.g., $V_t$ (off)), and the predetermined threshold voltage (e.g., $V_t$ (off)) is negative, positive, or equal to zero. As an example, if the transistor 830 is turned on, $$V_{2871}=V_{832}-V_t\text{ (off)} \quad \text{(Equation 6)}$$

where $V_{2871}$ represents the voltage 2871, and $V_{832}$ represents the voltage 832. Additionally, $V_t$ (off) represents the predetermined threshold voltage, which has a negative value, a zero value, or a positive value.

As shown in FIG. 8, the voltage 2871 is received by an inverting input terminal (e.g., the "−" input terminal) of the comparator 2872, which also includes a non-inverting input terminal (e.g., the "+" input terminal) according to some embodiments. In certain examples, the non-inverting input terminal of the comparator 2872 is biased to the voltage 2868 at the terminal 868 (e.g., GND). For example, based at least in part on the voltage 2871 received by the inverting input terminal and the voltage 2868 at the terminal 868 (e.g., GND) received by the non-inverting input terminal, the comparator 2872 generates a signal 872. As an example, the signal 872 is at a logic high level if the voltage 2871 is lower than the ground voltage, and the signal 872 is at a logic low level if the voltage 2871 is higher than the ground voltage. In some examples, the signal 872 is received by the NOR gate 874.

According to certain embodiments, a logic signal 882 (e.g., sr) is received by the minimum on-time controller 854, which in response, generates a signal 855 based at least in part on the logic signal 882 (e.g., sr). In some examples, if the logic signal 882 (e.g., sr) changes from the logic low level to the logic high level when the signal 855 is at the logic low level, the signal 855 changes from the logic low level to the logic high level. For example, after the signal 855 changes from the logic low level to the logic high level, the signal 855 remains at the logic high level for at least a predetermined minimum turn-on time duration (e.g., $T_{on\_min}$). As an example, during the predetermined minimum turn-on time duration (e.g., $T_{on\_min}$), the signal 855 remains at the logic high level, even if the logic signal 882 (e.g., sr) changes from the logic high level to the logic low level. In certain examples, the signal 855 is received by the NOR gate 874, which also receives the signal 872 and generates a signal 876 based at least in part on the signal 855 and the signal 872.

According to some embodiments, the turn-on controller 2840 receives the logic signal 882 (e.g., sr) and the voltage 832 and generates a signal 842 based at least in part on the logic signal 882 (e.g., sr) and the voltage 832. For example, the signal 842 is received by the NOR gate 844, which also receives the signal 853 and generates a signal 846 based at least in part on the signal 842 and the signal 853.

As shown in FIG. 8, the signal 846 and the signal 876 are received by the flip-flop 880, which in response generates the logic signal 882 (e.g., sr) based at least in part on the signal 846 and the signal 876 according to certain embodiments. In some examples, the flip-flop 880 includes an R terminal, an S terminal, and a QN terminal. For example, the R terminal receives the signal 846, the S terminal receives the signal 876, and the QN terminal outputs the logic signal 882 (e.g., sr). In certain examples, the NOR gate 844, the voltage adjustment component 850, the comparator 852, the minimum on-time controller 854, the NOR gate 874, the flip-flop 880, the voltage adjustment component 2870, the comparator 2872, and the turn-on controller 2840 are parts of a logic signal generator 2802. For example, the logic signal generator 2802 generates the logic signal 882 (e.g., sr). As an example, the logic signal 882 (e.g., sr) is received by the driver 890.

In some embodiments, the voltage controller 2890 receives the logic signal 882 (e.g., sr) and the voltage 834 and generates a signal 2891 (e.g., $I_{out}$) based at least in part on the logic signal 882 (e.g., sr) and the voltage 834. For example, a signal 2891 is a current $I_{out}$. As an example, the signal 2891 (e.g., $I_{out}$) is an adjustment signal. In certain examples, the signal 2891 (e.g., $I_{out}$) represents the reference voltage $V_t$ (reg) at which the voltage difference from the voltage 832 at the terminal 862 (e.g., $V_d$) to the voltage 2868 at the terminal 868 (e.g., GND) is regulated. For example, the voltage difference from the voltage 832 at the terminal 862 (e.g., $V_d$) to the voltage 2868 (e.g., the ground voltage) at the terminal 868 (e.g., GND) is the same as the voltage difference from the drain terminal to the source terminal of the transistor 680 (e.g., a MOSFET MS2). As an example, the voltage difference from the voltage 832 at the terminal 862 (e.g., $V_d$) to the voltage 2868 at the terminal 868 (e.g., GND) is the same as the voltage difference from the drain terminal to the source terminal of the transistor 780 (e.g., a MOSFET MS2). In some examples, the reference voltage $V_t$ (reg) represents a voltage value that activates a voltage regulation for the voltage difference from the voltage 832 at the terminal 862 (e.g., $V_d$) to the voltage 2868 at the terminal 868 (e.g., GND) so that the voltage difference from the voltage 832 at the terminal 862 (e.g., $V_d$) to the voltage 2868 at the terminal 868 (e.g., GND) is regulated to remain equal to the reference voltage $V_t$ (reg).

In certain embodiments, the driver 890 receives the signal 2891 (e.g., $I_{out}$) and the logic signal 882 (e.g., sr), generates a voltage 892 (e.g., a drive voltage) based at least in part on the signal 2891 (e.g., $I_{out}$) and the logic signal 882 (e.g., sr), and sends out the voltage 892 through the terminal 866. In some examples, the logic signal 882 (e.g., sr) is used to determine whether the voltage 892 (e.g., a drive voltage) is at a logic high level or at a logic low level. For example, if the logic signal 882 (e.g., sr) is at the logic high level, the driver 890 generates the voltage 892 (e.g., a drive voltage) at the logic high level, and if the logic signal 882 (e.g., sr) is at the logic low level, the driver 890 generates the voltage 892 (e.g., a drive voltage) at the logic low level. As an example, if the voltage 892 (e.g., a drive voltage) is at the logic high level, the transistor 680 (e.g., a MOSFET MS2) and/or the transistor 780 (e.g., a MOSFET MS2) is turned on, and if the voltage 892 (e.g., a drive voltage) is at the logic low level, the transistor 680 (e.g., a MOSFET MS2) and/or the transistor 780 (e.g., a MOSFET MS2) is turned off.

Figure 10:
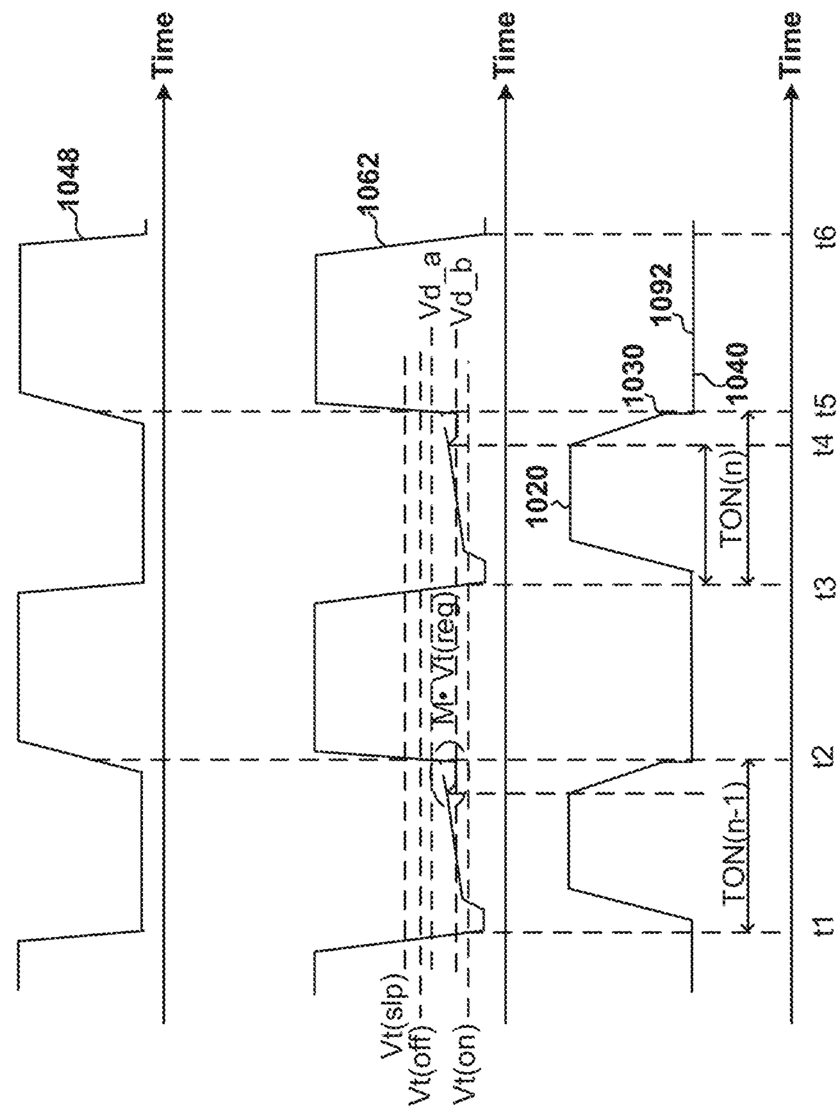
FIG. 10 shows simplified timing diagrams in deep continuous conduction mode (DCCM) related to the controller for synchronous rectification as shown in FIG. 8 as part of the flyback power converter as shown in FIG. 6 and/or as part of the flyback power converter as shown in FIG. 7 according to some embodiments.

In certain examples, the signal 2891 (e.g., $I_{out}$) is used to reduce the value of the voltage 892 (e.g., a drive voltage) when the voltage 892 (e.g., a drive voltage) is at the logic high level. For example, if the signal 2891 (e.g., $I_{out}$) is equal to zero in magnitude, the value of the voltage 892 (e.g., a drive voltage) remains unchanged and equal to a voltage value (e.g., a high voltage value 1020 as shown in FIG. 10) that corresponds to the logic high level. As an example, if the signal 2891 (e.g., $I_{out}$) is larger than zero in magnitude, the value of the voltage 892 (e.g., a drive voltage) decreases (e.g., decreases from the high voltage value 1020 as shown in FIG. 10), even though the voltage 892 (e.g., a drive voltage) remains at the logic high level.

According to certain embodiments, the driver 890 generates the voltage 892 (e.g., a drive voltage) based at least in part on the signal 2891 (e.g., $I_{out}$) and the logic signal 882 (e.g., sr). For example, if the logic signal 882 (e.g., sr) is at the logic low level, the driver 890 generates the voltage 892 (e.g., a drive voltage) at the logic low level, and the voltage 892 (e.g., a drive voltage) remains at a low voltage value (e.g., a low voltage value 1040 as shown in FIG. 10) regardless of the logic signal 882 (e.g., sr), wherein the low voltage value (e.g., the low voltage value 1040 as shown in FIG. 10) corresponds to the logic low level. As an example, if the logic signal 882 (e.g., sr) is at the logic high level, the driver 890 generates the voltage 892 (e.g., a drive voltage) at the logic high level, and the voltage 892 (e.g., a drive voltage) has a voltage value that depends on the signal 2891 (e.g., $I_{out}$), wherein the voltage value corresponds to the logic high level.

In some examples, if the logic signal 882 (e.g., sr) is at the logic high level and the signal 2891 (e.g., $I_{out}$) is equal to zero in magnitude, the driver 890 generates the voltage 892 (e.g., a drive voltage) at the logic high level, and the voltage 892 (e.g., a drive voltage) remains at a voltage value (e.g., the high voltage value 1020 as shown in FIG. 10), wherein the voltage value (e.g., the high voltage value 1020 as shown in FIG. 10) corresponds to the logic high level. In certain examples, if the logic signal 882 (e.g., sr) is at the logic high level and the signal 2891 (e.g., $I_{out}$) is larger than zero in magnitude, the driver 890 generates the voltage 892 (e.g., a drive voltage) at the logic high level, and the voltage 892 (e.g., a drive voltage) has a voltage value that changes with time, wherein the voltage value corresponds to the logic high level. For example, if the logic signal 882 (e.g., sr) is at the logic high level and the signal 2891 (e.g., $I_{out}$) is larger than zero in magnitude, the driver 890 generates the voltage 892 (e.g., a drive voltage) at the logic high level, and the voltage 892 (e.g., a drive voltage) decreases from a voltage value (e.g., the high voltage value 1020 as shown in FIG. 10) to another voltage value (e.g., an intermediate voltage value 1030 as shown in FIG. 10), wherein both the voltage value (e.g., the high voltage value 1020 as shown in FIG. 10) and the another voltage value (e.g., the intermediate voltage value 1030 as shown in FIG. 10) correspond to the logic high level.

According to some embodiments, the voltage controller 2890 receives the logic signal 882 (e.g., sr) and uses the logic signal 882 (e.g., sr) to determine the reference voltage $V_t$ (reg) at which the voltage difference from the voltage 832 at the terminal 862 (e.g., $V_d$) to the voltage 2868 at the terminal 868 (e.g., GND) is regulated. For example, if the reference voltage $V_t$ (reg) is equal to a voltage value $V_{d\_a}$, at the voltage value $V_{d\_a}$, a voltage regulation for the voltage difference from the voltage 832 at the terminal 862 (e.g., $V_d$) to the voltage 2868 at the terminal 868 (e.g., GND) is activated, so that the voltage difference from the voltage 832 at the terminal 862 (e.g., $V_d$) to the voltage 2868 at the terminal 868 (e.g., GND) is regulated to remain equal to the voltage value $V_{d\_a}$. As an example, if the reference voltage $V_t$ (reg) is equal to a voltage value $V_{d\_b}$, at the voltage value $V_{d\_b}$, a voltage regulation for the voltage difference from the voltage 832 at the terminal 862 (e.g., $V_d$) to the voltage 2868 at the terminal 868 (e.g., GND) is activated, so that the voltage difference from the voltage 832 at the terminal 862 (e.g., $V_d$) to the voltage 2868 at the terminal 868 (e.g., GND) is regulated to remain equal to the voltage value $V_{d\_b}$.

In certain examples, the voltage controller 2890 determines that the reference voltage $V_t$ (reg) changes from the voltage value $V_{d\_a}$ to another voltage value $V_{d\_b}$. For example, the voltage value $V_{d\_b}$ is smaller than the voltage value $V_{d\_a}$. In some examples, the voltage controller 2890 determines that the reference voltage $V_t$ (reg), at which the voltage regulation for the voltage difference from the voltage 832 at the terminal 862 (e.g., $V_d$) to the voltage 2868 at the terminal 868 (e.g., GND) is activated, decreases from the voltage value $V_{d\_a}$ to the voltage value $V_{d\_b}$. As an example, the controller 860 for synchronous rectification performs variable voltage regulation for the voltage difference from the voltage 832 at the terminal 862 (e.g., $V_d$) to the voltage 2868 at the terminal 868 (e.g., GND) by changing the reference voltage $V_t$ (reg).

According to certain embodiments, the voltage controller 2890 uses the voltage 834 and the reference voltage $V_t$ (reg) to determine whether the voltage regulation for the voltage difference from the voltage 832 at the terminal 862 (e.g., $V_d$) to the voltage 2868 at the terminal 868 (e.g., GND) needs to be activated. For example, if the transistor 830 is turned on by the supply voltage 814, the voltage 834 is equal to the voltage 832 at the terminal 862 (e.g., $V_d$). In some examples, if the reference voltage $V_t$ (reg) at which the voltage difference from the voltage 832 at the terminal 862 (e.g., $V_d$) to the voltage 2868 at the terminal 868 (e.g., GND) is regulated decreases from the voltage value $V_{d\_a}$ to the voltage value $V_{d\_b}$, the voltage regulation for the voltage difference from the voltage 832 at the terminal 862 (e.g., $V_d$) to the voltage 2868 at the terminal 868 (e.g., GND) is activated when the voltage difference from the voltage 832 at the terminal 862 (e.g., $V_d$) to the voltage 2868 at the terminal 868 (e.g., GND) becomes slightly larger than the voltage value $V_{d\_b}$, even though the voltage difference from the voltage 832 at the terminal 862 (e.g., $V_d$) to the voltage 2868 at the terminal 868 (e.g., GND) remains smaller than the voltage value $V_{d\_a}$. In certain examples, the voltage controller 2890 outputs the signal 2891 (e.g., $I_{out}$) to indicate whether the voltage regulation for the voltage difference from the voltage 832 at the terminal 862 (e.g., $V_d$) to the voltage 2868 at the terminal 868 (e.g., GND) is activated. For example, if the signal 2891 (e.g., $I_{out}$) is equal to zero in magnitude, the voltage regulation for the voltage difference from the voltage 832 at the terminal 862 (e.g., $V_d$) to the voltage 2868 at the terminal 868 (e.g., GND) is not activated, causing the value of the voltage 892 (e.g., a drive voltage) remains at the high voltage value (e.g., the high voltage value 1020 as shown in FIG. 10) that corresponds to the logic high level, if the logic signal 882 (e.g., sr) is at the logic high level. As an example, if the signal 2891 (e.g., $I_{out}$) is larger than zero in magnitude, the voltage regulation for the voltage difference from the voltage 832 at the terminal 862 (e.g., $V_d$) to the voltage 2868 at the terminal 868 (e.g., GND) is activated, causing the value of the voltage 892 (e.g., a drive voltage) to decrease from the high voltage value (e.g., the high voltage value 1020 as shown in FIG. 10) but still remain at the logic high level, if the logic signal 882 (e.g., sr) is at the logic high level.

Figure 9:
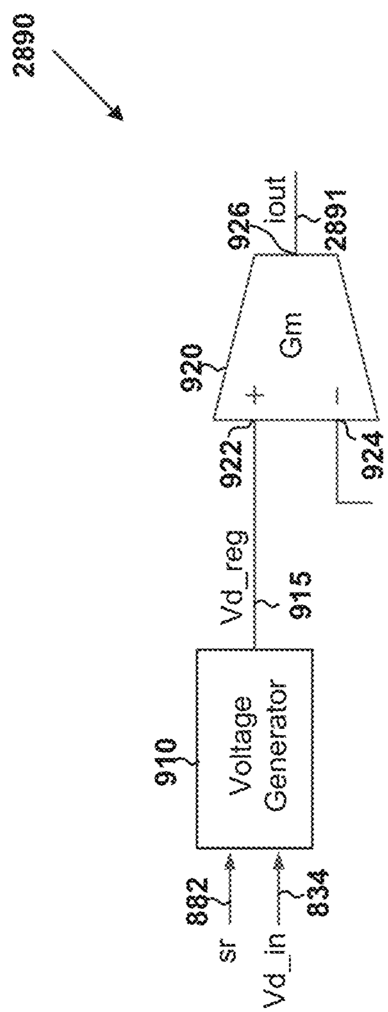
FIG. 9 is a simplified diagram showing the voltage controller as part of the controller for synchronous rectification as shown in FIG. 8 according to some embodiments of the present invention.

FIG. 9 is a simplified diagram showing the voltage controller 2890 as part of the controller 860 for synchronous rectification as shown in FIG. 8 according to some embodiments of the present invention. This diagram is merely an example, which should not unduly limit the scope of the claims. One of ordinary skill in the art would recognize many variations, alternatives, and modifications. The voltage controller 2890 includes a voltage generator 910 and a regulation controller 920. Although the above has been shown using a selected group of components for the voltage controller 2890, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the voltage generator 910 receives the logic signal 882 (e.g., sr) and the voltage 834 and generates a voltage signal 915 based at least in part on the logic signal 882 (e.g., sr) and the voltage 834. In some examples, the voltage generator 910 uses the logic signal 882 (e.g., sr) to determine the reference voltage $V_t$ (reg) at which the voltage difference from the voltage 832 at the terminal 862 (e.g., $V_d$) to the voltage 2868 at the terminal 868 (e.g., GND) is regulated. For example, the regulation controller 910 determines that the reference voltage $V_t$ (reg) changes from a voltage value $V_{d\_a}$ to another voltage value $V_{d\_b}$. As an example, the regulation controller 910 determines that the reference voltage $V_t$ (reg) at which the voltage difference from the voltage 832 at the terminal 862 (e.g., $V_d$) to the voltage 2868 at the terminal 868 (e.g., GND) is regulated decreases from the voltage value $V_{d\_a}$ to the voltage value $V_{d\_b}$, wherein the voltage value $V_{d\_b}$ is smaller than the voltage value $V_{d\_a}$. In certain examples, the voltage generator 910 uses the voltage 834 and the determined reference voltage $V_t$ (reg) to generate the voltage signal 915. For example, if the transistor 830 is turned on by the supply voltage 814, the voltage 834 is equal to the voltage 832 at the terminal 862 (e.g., $V_d$). As an example, the voltage signal 915 indicates whether the voltage 832 at the terminal 862 (e.g., $V_d$) is larger than the determined reference voltage $V_t$ (reg).

According to some embodiments, the regulation controller 910 uses the voltage 834 to compare the determined reference voltage $V_t$ (reg) with the voltage 834, which is used to represent the voltage 832 at the terminal 862 (e.g., $V_d$). For example, if the voltage 834 is smaller than the determined reference voltage $V_t$ (reg), the voltage signal 915 is smaller than zero, indicating that the voltage 832 at the terminal 862 (e.g., $V_d$) is smaller than the determined reference voltage $V_t$ (reg). As an example, if the voltage 834 is larger than the determined reference voltage $V_t$ (reg), the voltage signal 915 is larger than zero, indicating that the voltage 832 at the terminal 862 (e.g., $V_d$) is smaller than the determined reference voltage $V_t$ (reg). In certain examples, if the transistor 830 is turned on by the supply voltage 814, the voltage 834 is equal to the voltage 832 at the terminal 862 (e.g., $V_d$), and the voltage signal 915 is equal to the voltage 832 at the terminal 862 (e.g., $V_d$) minus the determined reference voltage $V_t$ (reg).

According to certain embodiments, the regulation controller 920 includes a transconductance amplifier. In some examples, the transconductance amplifier 920 includes a non-inverting input terminal 922 (e.g., the "+" terminal), an inverting input terminal 924 (e.g., the "−" terminal), and an output terminal 926. For example, the non-inverting input terminal 922 (e.g., the "+" terminal) receives the voltage signal 915, and the inverting input terminal 924 (e.g., the "−" terminal) is biased to the voltage 2868 at the terminal 868 (e.g., GND). As an example, the output terminal 926 outputs the signal 2891 (e.g., $I_{out}$). In certain examples, the transconductance amplifier 920 generates the signal 2891 (e.g., $I_{out}$) based at least in part on the voltage signal 915 and the voltage 2868 at the terminal 868 (e.g., GND).

In some embodiments, if the voltage signal 915 is smaller than the voltage 2868 at the terminal 868 (e.g., GND), the signal 2891 (e.g., $I_{out}$) is equal to zero in magnitude, indicating that the voltage difference from the voltage 832 at the terminal 862 (e.g., $V_d$) to the voltage 2868 at the terminal 868 (e.g., GND) is not larger than the determined reference voltage $V_t$ (reg) and that the regulation for the voltage difference is not activated. For example, if the voltage difference from the voltage 832 at the terminal 862 (e.g., $V_d$) to the voltage 2868 at the terminal 868 (e.g., GND) is not larger than the determined reference voltage $V_t$ (reg), the signal 2891 (e.g., $I_{out}$) is equal to zero in magnitude. In certain embodiments, if the voltage signal 915 is larger than the voltage 2868 at the terminal 868 (e.g., GND), the signal 2891 (e.g., $I_{out}$) is larger than zero in magnitude, indicating that the voltage difference from the voltage 832 at the terminal 862 (e.g., $V_d$) to the voltage 2868 at the terminal 868 (e.g., GND) is larger than the determined reference voltage $V_t$ (reg) and that the regulation for the voltage difference is activated. As an example, if the voltage difference from the voltage 832 at the terminal 862 (e.g., $V_d$) to the voltage 2868 at the terminal 868 (e.g., GND) is larger than the determined reference voltage $V_t$ (reg), the signal 2891 (e.g., $I_{out}$) is larger than equal to zero in magnitude.

FIG. 10 shows simplified timing diagrams in deep continuous conduction mode (DCCM) related to the controller 860 for synchronous rectification as shown in FIG. 8 as part of the flyback power converter 600 as shown in FIG. 6 and/or as part of the flyback power converter 700 as shown in FIG. 7 according to some embodiments. For example, the waveform 1048 represents the voltage 648 as a function of time, the waveform 1062 represents a voltage difference from the drain terminal to the source terminal of the transistor 680 as a function of time, and the waveform 1092 represents the voltage 696, which is equal to the voltage 892, as a function of time. As an example, the waveform 1048 represents the voltage 748 as a function of time, the waveform 1062 represents a voltage difference from the drain terminal to the source terminal of the transistor 780 as a function of time, and the waveform 1092 represents the voltage 796, which is equal to the voltage 892, as a function of time.

In certain examples, $V_t$ (sip) represents a reference voltage (e.g., equal to 2 V), $V_t$ (off) represents the predetermined threshold voltage (e.g., equal to 0 mV) related to the voltage adjustment component 2870, and $V_t$ (on) represents the predetermined threshold voltage (e.g., equal to −200 mV) related to the voltage adjustment component 850. In some examples, $V_{d\_a}$ and $V_{d\_b}$ are values for a reference voltage $V_t$ (reg). For example, the reference voltage $V_t$ (reg) has a value of $V_{d\_a}$ (e.g., equal to −20 mV). As an example, the reference voltage $V_t$ (reg) has a value of $V_{d\_b}$, which is different from the value of $V_{d\_a}$. In certain examples, $V_{d\_b}$ is equal to $M \times V_{d\_a}$, wherein M is a positive number larger than 1 (e.g., equal to 3). For example, $V_{d\_a}$ is smaller than zero, and $V_{d\_b}$ is also smaller than zero, wherein $V_{d\_a}$ (e.g., equal to −20 mV) is larger than $V_{d\_b}$ (e.g., equal to −60 mV).

As shown in FIG. 10, the time duration from time $t_1$ to time $t_3$ corresponds to the $(n-1)^{th}$ switching cycle of the logic signal 882 (e.g., sr), and the time duration from time $t_3$ to time $t_6$ corresponds to the $n^{th}$ switching cycle of the logic signal 882 (e.g., sr), wherein n is an integer larger than one, according to certain embodiments. For example, time $t_1$ represents the beginning of the $(n-1)^{th}$ switching cycle of the logic signal 882 (e.g., sr), and time $t_3$ represents the end of the $(n-1)^{th}$ switching cycle of the logic signal 882 (e.g., sr). As an example, time $t_3$ represents the beginning of the $n^{th}$ switching cycle of the logic signal 882 (e.g., sr), and time $t_6$ represents the end of the $n^{th}$ switching cycle of the logic signal 882 (e.g., sr). In some examples, during the $(n-1)^{th}$ switching cycle, the logic signal 882 (e.g., sr) is at the logic high level from time $t_1$ to time $t_2$, and the logic signal 882 (e.g., sr) is at the logic low level from time $t_2$ to time $t_3$. For example, $T_{ON(n-1)}$ represents the time duration from time $t_1$ to time $t_2$ when the logic signal 882 (e.g., sr) is at the logic high level. In certain examples, during the $n^{th}$ switching cycle, the logic signal 882 (e.g., sr) is at the logic high level from time $t_3$ to time $t_5$, and the logic signal 882 (e.g., sr) is at the logic low level from time $t_5$ to time $t_6$. For example, $T_{ON(n)}$ represents the time duration from time $t_3$ to time $t_5$ when the logic signal 882 (e.g., sr) is at the logic high level. In certain examples, the time duration from time $t_3$ to time $t_4$ is equal to $K \times T_{ON(n-1)}$, wherein K is a positive number smaller than 1. For example, time $t_3$ represents the beginning of the time duration $K \times T_{ON(n-1)}$, and time $t_4$ represents the end of the time duration $K \times T_{ON(n-1)}$.

According to some embodiments, for the $n^{th}$ switching cycle, during the time duration from time $t_3$ to time $t_4$ that is equal to $K \times T_{ON(n-1)}$, the reference voltage $V_t$ (reg) has a value of $V_{d\_a}$ (e.g., equal to −20 mV), and after time $t_4$, the reference voltage $V_t$ (reg) has a value of $V_{d\_b}$ (e.g., equal to −60 mV). In certain examples, at time $t_4$, the reference voltage $V_t$ (reg) changes from $V_{d\_a}$ (e.g., equal to −20 mV) to $V_{d\_b}$ (e.g., equal to −60 mV). For example, at time $t_4$, the voltage difference from the drain terminal to the source terminal of the transistor 680 and/or the voltage difference from the drain terminal to the source terminal of the transistor 680 becomes larger than the reference voltage $V_t$ (reg) that is equal to $V_{d\_b}$ (e.g., equal to −60 mV), even though the voltage difference is still smaller than $V_{d\_a}$ (e.g., equal to −20 mV), causing the voltage regulation for the voltage difference from the drain terminal to the source terminal of the transistor 680 and/or for the voltage difference from the drain terminal to the source terminal of the transistor 780 is activated. As an example, the voltage difference from the drain terminal to the source terminal of the transistor 680 and/or the voltage difference from the drain terminal to the source terminal of the transistor 780 is regulated to remine equal to $V_{d\_b}$ (e.g., equal to −60 mV).

In some examples, during the time duration from time $t_4$ to time $t_5$, the voltage 696 and/or the voltage 796 decreases from the high voltage value 1020 to the intermediate voltage value 1030 in magnitude, even though the voltage 696 and/or the voltage 796 remains at the logic high level. For example, at time $t_5$, the magnitude of the current 692 (e.g., $I_{sec}$) and/or the magnitude of the current 792 (e.g., $I_{sec}$) becomes so small that the on resistance of the transistor 680 and/or the on resistance of the transistor 780 can no longer increase sufficiently to prevent the voltage difference from the drain terminal to the source terminal of the transistor 680 and/or the voltage difference from the drain terminal to the source terminal of the transistor 780 from becoming larger than the reference voltage $V_t$ (reg) that is equal to $V_{d\_b}$ (e.g., equal to −60 mV).

In certain examples, at time $t_5$, the voltage difference from the drain terminal to the source terminal of the transistor 680 and/or the voltage difference from the drain terminal to the source terminal of the transistor 780 increases and becomes larger than the predetermined threshold voltage $V_t$ (off) (e.g., equal to 0 mV). For example, at time $t_5$, the logic signal 882 (e.g., sr) changes from the logic high level to the logic low level. As an example, at time $t_5$, the voltage 696 and/or the voltage 796 decreases from the intermediate voltage value 1030 to the low voltage value 1040, wherein the intermediate voltage value 1030 corresponds to the logic high level and the low voltage value 1040 corresponds to the logic low level. For example, at time $t_5$, the voltage 696 and/or the voltage 796 changes from the logic high level to the logic low level, causing the transistor 680 (e.g., a MOSFET MS2) and/or the transistor 780 (e.g., a MOSFET MS2) to change from being turned on to being turned off.

In some examples, from time $t_5$ to time $t_6$, the logic signal 882 (e.g., sr) remains at the logic low level. As an example, from time $t_5$ to time $t_6$, the voltage 696 and/or the voltage 796 remains constant at the low voltage value 1040, regardless of whether or not the signal 2891 (e.g., $I_{out}$) is equal to zero in magnitude. For example, from time $t_5$ to time $t_6$, the voltage 696 and/or the voltage 796 remains at the logic low level, causing the transistor 680 (e.g., a MOSFET MS2) and/or the transistor 780 (e.g., a MOSFET MS2) to remain turned off.

Figure 11:
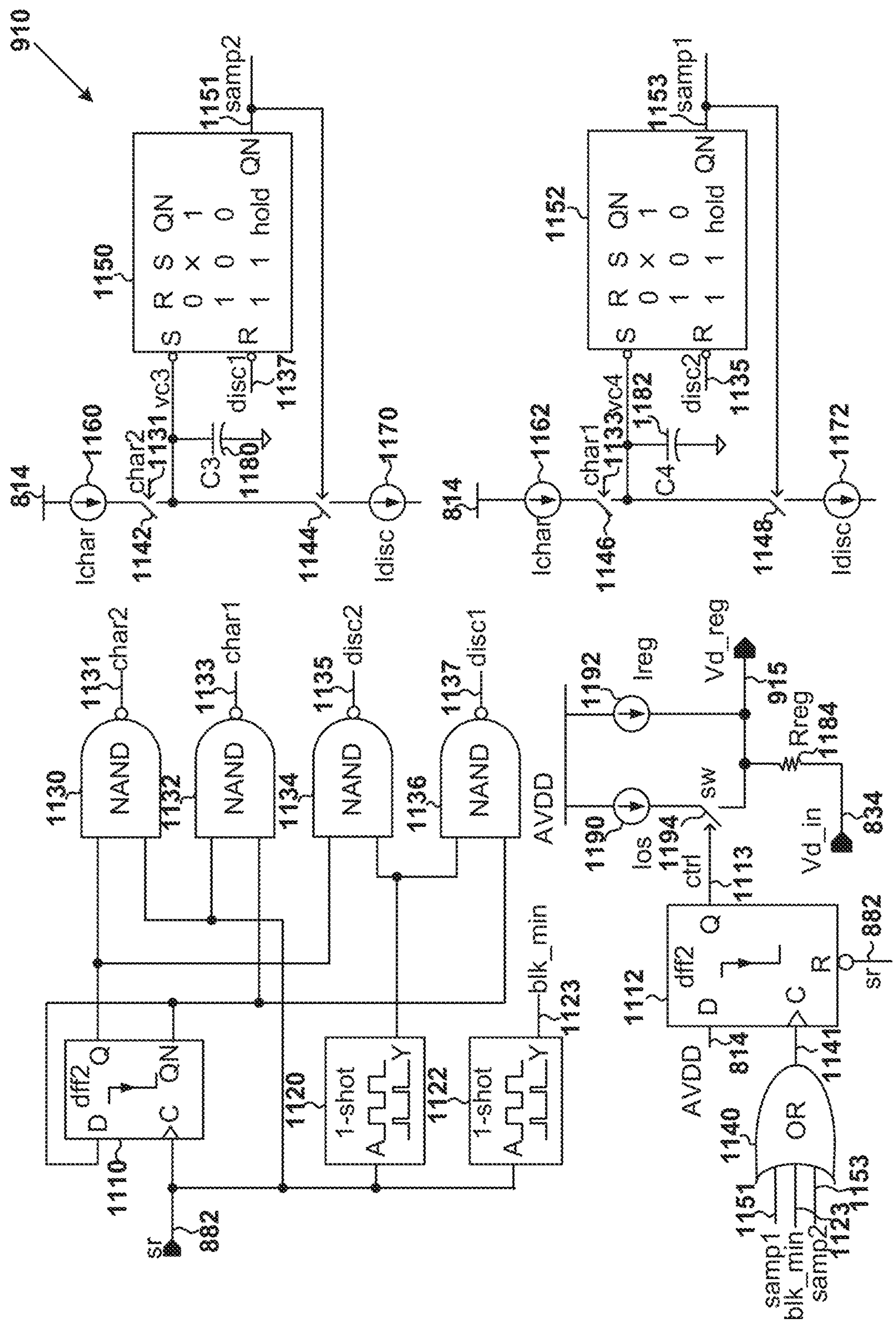
FIG. 11 is a simplified diagram showing the voltage generator of the voltage controller as shown in FIG. 9 as part of the controller for synchronous rectification as shown in FIG. 8 according to some embodiments of the present invention.

FIG. 11 is a simplified diagram showing the voltage generator 910 of the voltage controller 2890 as shown in FIG. 9 as part of the controller 860 for synchronous rectification as shown in FIG. 8 according to some embodiments of the present invention. This diagram is merely an example, which should not unduly limit the scope of the claims. One of ordinary skill in the art would recognize many variations, alternatives, and modifications. The voltage generator 910 includes D-type flip flops 1110 and 1112, one-shot pulse generators 1120 and 1122, NAND gates 1130, 1132, 1134 and 1136, an OR gate 1140, SR-type flip flops 1150 and 1152, current sources 1160 and 1162, current sinks 1170 and 1172, capacitors 1180 and 1182, a resistor 1184, current sources 1190 and 1192, and switches 1142, 1144, 1146, 1148 and 1194. Although the above has been shown using a selected group of components for the voltage generator 910, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the D-type flip flop 1110 (e.g., dff1) and the one-shot pulse generators 1120 and 1122 each receive the logic signal 882 (e.g., sr). For example, the D-type flip flop 1110 (e.g., dff1) and the one-shot pulse generator 1120 each are connected to one or more NAND gates of the NAND gates 1130, 1132, 1134 and 1136. As an example, the one-shot pulse generator 1122 generates a signal 1123 (e.g., blk_min). As an example, the signal 1123 (e.g., blk_min) includes one or more pulses, and each pulse has a predetermined pulse width (e.g., 2 μs). In some examples, the NAND gate 1130 generates a logic signal 1131 (e.g., char2), the NAND gate 1132 generates a logic signal 1133 (e.g., char1), the NAND gate 1134 generates a logic signal 1135 (e.g., disc2), and the NAND gate 1136 generates a logic signal 1135 (e.g., disc1). For example, the logic signal 1131 (e.g., char2) is used to close and/or open the switch 1142, and the logic signal 1133 (e.g., char1) is used to close and/or open the switch 1146. As an example, the logic signal 1135 (e.g., disc2) is received by the SR-type flip flop 1152, and the logic signal 1137 (e.g., disc1) is received by the SR-type flip flop 1150. In certain examples, the current sources 1160 and 1162 each are biased to the supply voltage 814 (e.g., AVDD), and the current sinks 1170 and 1172 each are biased to the voltage 2868 at the terminal 868 (e.g., GND).

In some embodiments, the SR-type flip flop 1150 generates a signal 1151 (e.g., samp2), and the SR-type flip flop 1152 generates a signal 1153 (e.g., samp1). For example, the signal 1151 (e.g., samp2) and the signal 1153 (e.g., samp1) are received by the OR gate 1140, which also receives the signal 1123 (e.g., blk_min). As an example, the OR gate 1140 generates a signal 1141. In certain examples, the D-type flip flop 1112 receives the signal 1141, the supply voltage 814 (e.g., AVDD) and the logic signal 882 (e.g., sr), and generates a signal 1113 (e.g., ctrl). For example, the signal 1113 (e.g., ctrl) is used to close and/or open the switch 1194. In some examples, one terminal of the resistor 1184 (e.g., $R_{reg}$) is connected to the switch 1194 and is biased to the voltage signal 915. For example, another terminal of the resistor 1184 (e.g., $R_{reg}$) receives the voltage 834.

According to certain embodiments, the switches 1142 and 1144, the SR-type flip flop 1150, the current source 1160, the current sink 1170, and the capacitor 1180 are parts of a signal generator that generates the signal 1151, and the switches 1146 and 1148, the SR-type flip flop 1152, the current source 1162, the current sink 1172, and the capacitor 1182 are parts of another signal generator that generates the signal 1153 (e.g., samp1). For example, the current source 1160 outputs a current that has the same magnitude (e.g., $I_{char}$) as the current outputted by the current source 1162, and the current sink 1170 receives a current that has the same magnitude (e.g., $I_{disc}$) as the current received by the current sink 1172. As an example, the signal generator that generates the signal 1151 and the signal generator that generates the signal 1153 (e.g., samp1) have the same structure, but these two signal generators operate alternately.

In some examples, alternately, the current source 1160 charges the capacitor 1180 periodically and the current source 1162 charges the capacitor 1182 periodically, and alternately, the current sink 1170 discharges the capacitor 1180 periodically and the current sink 1172 discharges the capacitor 1182 periodically. For example, the alternate charging of the capacitor 1180 and the capacitor 1182 is used to store the on-time $T_{ON(n-1)}$ of the previous switching cycle of the logic signal 882 (e.g., sr). As an example, the alternate discharging of the capacitor 1180 and the capacitor 1182 is used to determine $K \times T_{ON(n-1)}$ for the current switching cycle of the logic signal 882 (e.g., sr), wherein K is a positive number smaller than 1 (e.g., K being equal to 0.85). In certain examples, the number K is determined as follows:

$$K = \frac{I_{char}}{I_{disc}} \quad \text{(Equation 7)}$$

where $I_{char}$ represents the magnitude of the current outputted by the current source 1160 and also represents the magnitude of the current outputted by the current source 1162. Also, $I_{disc}$ represents the magnitude of the current received by the current sink 1170 and also represents the magnitude of the current received by the current sink 1172.

In some embodiments, for the current switching cycle, from the time when the logic signal 882 (e.g., sr) changes from the logic low level to the logic high level until the end of $K \times T_{ON(n-1)}$, the signal 1113 (e.g., ctrl) is at the logic low level. For example, when the signal 1113 (e.g., ctrl) is at the logic low level, the switch 1194 is open. As an example, if the switch 1194 is open, the current source 1190 does not provide a current to flow through the resistor 1184 (e.g., $R_{reg}$), even though the current source 1192 still provides a current to flow through the resistor 1184 (e.g., $R_{reg}$). In certain examples, for the current switching cycle, from the time when the logic signal 882 (e.g., sr) changes from the logic low level to the logic high level until the end of $K \times T_{ON(n-1)}$, the voltage signal 915 is determined as follows:

$$V_{d\_reg} = V_{d\_in} + I_{reg} \times R_{reg} \quad \text{(Equation 8)}$$

where $V_{d\_reg}$ represents the voltage signal 915, and $V_{d\_in}$ represents the voltage 834. Additionally, $I_{reg}$ represents the current provided by the current source 1192, and $R_{reg}$ represents the resistance of the resistor 1184. For example, the voltage signal 915 is equal to the voltage 834 minus the reference voltage $V_t$ (reg), so the reference voltage $V_t$ (reg) is determined as follows:

$$V_{t\_reg} = -I_{reg} \times R_{reg} \quad \text{(Equation 9)}$$

where $I_{reg}$ represents the current provided by the current source 1192, and $R_{reg}$ represents the resistance of the resistor 1184. As an example, for the current switching cycle, from the time when the logic signal 882 (e.g., sr) changes from the logic low level to the logic high level until the end of $K \times T_{ON(n-1)}$, $V_{d\_a}$ represents the value of the reference voltage $V_t$ (reg) as follows:

$$V_{d\_a} = -I_{reg} \times R_{reg} \quad \text{(Equation 10)}$$

where $I_{reg}$ represents the current outputted by the current source 1192, and $R_{reg}$ represents the resistance of the resistor 1184.

In certain embodiments, for the current switching cycle, from the time when $K \times T_{ON(n-1)}$ ends until the time when the logic signal 882 (e.g., sr) changes from the logic high level to the logic low level, the signal 1113 (e.g., ctrl) is at the logic high level. For example, when the signal 1113 (e.g., ctrl) is at the logic high level, the switch 1194 is closed. As an example, if the switch 1194 is closed, the current source 1190 provides a current to flow through the resistor 1184 (e.g., $R_{reg}$), even though the current source 1192 also provides a current to flow through the resistor 1184 (e.g., $R_{reg}$). In some examples, for the current switching cycle, from the time when $K \times T_{ON(n-1)}$ ends until the time when the logic signal 882 (e.g., sr) changes from the logic high level to the logic low level, the voltage signal 915 is determined as follows:

$$V_{d\_reg} = V_{d\_in} + (I_{os} + I_{reg}) \times R_{reg} \quad \text{(Equation 11)}$$

where $V_{d\_reg}$ represents the voltage signal 915, and $V_{d\_in}$ represents the voltage 834. Additionally, $I_{os}$ represents the current provided by the current source 1190, and $I_{reg}$ represents the current provided by the current source 1192. Also, $R_{reg}$ represents the resistance of the resistor 1184. For example, the voltage signal 915 is equal to the voltage 834 minus the reference voltage $V_t$ (reg), so the reference voltage $V_t$ (reg) is determined as follows:

$$V_{t\_reg}=-(I_{os}+I_{reg})\times R_{reg} \quad \text{(Equation 12)}$$

where $I_{os}$ represents the current provided by the current source 1190, and $I_{reg}$ represents the current provided by the current source 1192. Additionally, $R_{reg}$ represents the resistance of the resistor 1184. As an example, for the current switching cycle, from the time when $K\times T_{ON(n-1)}$ ends until the time when the logic signal 882 (e.g., sr) changes from the logic high level to the logic low level, $V_{d\_b}$ represents the value of the reference voltage $V_t$ (reg) as follows:

$$V_{d\_b}=-(I_{os}+I_{reg})\times R_{reg} \quad \text{(Equation 13)}$$

where $I_{os}$ represents the current provided by the current source 1190, and $I_{reg}$ represents the current provided by the current source 1192. Additionally, $R_{reg}$ represents the resistance of the resistor 1184.

In certain examples, for the current switching cycle, the value $V_{d\_a}$ of the reference voltage $V_t$ (reg) from the time when the logic signal 882 (e.g., sr) changes from the logic low level to the logic high level until the end of $K\times T_{ON(n-1)}$ and the value $V_{d\_b}$ of the reference voltage $V_t$ (reg) from the time when $K\times T_{ON(n-1)}$ ends until the time when the logic signal 882 (e.g., sr) changes from the logic high level to the logic low level has the following relationship:

$$V_{d\_b}=M\times V_{d\_a} \quad \text{(Equation 14)}$$

where M is a positive number larger than 1. As an example, based on at least Equations 10 and 13, M is determined as follows:

$$M=\frac{I_{os}}{I_{reg}}+1 \quad \text{(Equation 15)}$$

where $I_{os}$ represents the current provided by the current source 1190, and $I_{reg}$ represents the current provided by the current source 1192.

As shown by FIG. 9, FIG. 10, and/or FIG. 11, the voltage controller 2890 is configured to, for a current switching cycle of the logic signal 882 (e.g., sr), determine a time duration equal to $K\times T_{ON(n-1)}$, wherein $T_{ON(n-1)}$ represents the time duration during which the logic signal 882 (e.g., sr) remains at the logic high level for the previous switching cycle of the logic signal 882 (e.g., sr) and K is a positive number smaller than 1 according to some embodiments. For example, the positive number K is determined according to Equation 7. In certain examples, the voltage value $V_{d\_a}$ of the reference voltage $V_t$ (reg) is determined by the current outputted by the current source 1192 and flowing through the resistor 1184 according to Equation 10. In some examples, the voltage value $V_{d\_b}$ of the reference voltage $V_t$ (reg) is determined by the current outputted by the current source 1190 and flowing through the resistor 1184 and also by the current outputted by the current source 1192 and flowing through the resistor 1184 according to Equation 13.

Some embodiments of the present invention provide a controller for synchronous rectification as part of a flyback power converter, significantly reducing a spike in the voltage difference from a drain terminal to a source terminal of a transistor as part of a synchronous rectifier of the flyback power converter and also significantly improving the reliability of the synchronous rectifier of the flyback power converter. For example, the controller for synchronous rectification as part of the flyback power converter can significantly reduce the spike in the voltage difference from the drain terminal to the source terminal of the transistor as part of the synchronous rectifier when the flyback power converter operates in the continuous conduction mode (CCM), especially in the deep continuous conduction mode (DCCM). As an example, the synchronous rectifier of the flyback power converter also includes the controller for synchronous rectification.

Certain embodiments of the present invention provide a controller for synchronous rectification as part of a flyback power converter, wherein the controller for synchronous rectification performs variable voltage regulation for the voltage difference from a drain terminal to a source terminal of a transistor as part of a synchronous rectifier of the flyback power converter, significantly reducing a spike in the voltage difference from the drain terminal to the source terminal of the transistor as part of the synchronous rectifier of the flyback power converter and also significantly improving the reliability of the synchronous rectifier of the flyback power converter. For example, the synchronous rectifier of the flyback power converter also includes the controller for synchronous rectification.

According to some embodiments, a system for controlling synchronous rectification includes: a first controller terminal configured to receive a first input voltage; a second controller terminal biased to a second input voltage; a third controller terminal configured to output an output voltage; a first signal generator configured to generate a logic signal based on at least information associated with the first input voltage; a second signal generator configured to receive the logic signal and generate an adjustment signal based on at least information associated with the logic signal and the first input voltage; and a driver configured to receive the logic signal and the adjustment signal and generate the output voltage based at least in part on the logic signal and the adjustment signal; wherein the first signal generator is further configured to: at a beginning of a first switching cycle of the logic signal, change the logic signal from a first logic level to a second logic level; during the first switching cycle of the logic signal, from the beginning of the first switching cycle of the logic signal to a first time, keep the logic signal at the second logic level; and during the first switching cycle of the logic signal, at the first time, change the logic signal from the second logic level to the first logic level; wherein the second signal generator is further configured to, during a first time duration that starts at the beginning of the first switching cycle of the logic signal: determine a reference voltage equal to a first reference value; and if a voltage difference from the first input voltage to the second input voltage is larger than the first reference value, generate the adjustment signal that is not equal to zero based on at least information associated with the voltage difference and the first reference value; wherein the second signal generator is further configured to, after an end of the first time duration until the first time: determine the reference voltage equal to a second reference value, the second reference value being different from the first reference value; and if the voltage difference from the first input voltage to the second input voltage is larger than the second reference value, generate the adjustment signal that is not equal to zero based on at least information associated with the voltage difference and the second reference value; wherein the driver is configured to, from the beginning of the first switching cycle of the logic signal to the first time, if the adjustment signal is not equal to zero: change the output voltage from a first voltage value to a second voltage value; and keep the output voltage at the second logic level; wherein: the first voltage value corresponds to the second logic level; and the second voltage value corresponds to the second logic level; wherein the voltage difference from the first input voltage to the second input voltage is equal to the first input voltage minus the second input voltage. For example, the system for controlling synchronous rectification is implemented according to at least FIG. 8, FIG. 9, and/or FIG. 10.

As an example, the second signal generator is further configured to: during the first time duration that starts at the beginning of the first switching cycle of the logic signal, if the voltage difference from the first input voltage to the second input voltage is not larger than the first reference value, generate the adjustment signal that is equal to zero; and after the end of the first time duration until the first time, if the voltage difference from the first input voltage to the second input voltage is not larger than the second reference value, generate the adjustment signal that is equal to zero. For example, the driver is further configured to, when the logic signal is at the second logic level, if the adjustment signal is equal to zero: keep the output voltage constant at a third voltage value; and keep the output voltage at the second logic level; wherein the third voltage value corresponds to the second logic level. As an example, the second voltage value and the third voltage value are the same.

For example, the driver is further configured to, when the logic signal is at the second logic level, if the adjustment signal is not equal to zero: reduce the output voltage from the first voltage value to the second voltage value; and keep the output voltage at the second logic level; wherein the first voltage value is larger than the second voltage value. As an example, the driver is further configured to, when the logic signal is at the first logic level: keep the output voltage constant at a third voltage value regardless of whether or not the adjustment signal is equal to zero; and keep the output voltage at the first logic level; wherein the third voltage value corresponds to the first logic level. For example, the third voltage value is less than the first voltage value; and the third voltage value is less than the second voltage value.

As an example, the first logic level is a logic low level; and the second logic level is a logic high level. For example, the second signal generator is further configured to, during the first switching cycle of the logic signal, from the beginning of the first switching cycle of the logic signal to the first time, increase the reference voltage from the first reference value to the second reference value; and the first reference value is larger than the second reference value. For example, the first reference value is smaller than zero; and the second reference value is equal to a predetermined constant multiplied by the first reference value; wherein the predetermined constant is larger than one.

As an example, the first signal generator is further configured to: at a beginning of a second switching cycle of the logic signal, change the logic signal from the first logic level to the second logic level; during the second switching cycle of the logic signal, from the beginning of the second switching cycle of the logic signal to a second time, keep the logic signal at the second logic level; and during the second switching cycle of the logic signal, at the second time, change the logic signal from the second logic level to the first logic level; wherein the second switching cycle precedes the first switching cycle. For example, the first time duration is equal to a predetermined constant multiplied by a second time duration from the beginning of the second switching cycle of the logic signal to the second time; and the predetermined constant is larger than zero and smaller than one. As an example, the second switching cycle precedes immediately the first switching cycle; wherein an end of the second switching cycle is the beginning of the first switching cycle.

According to certain embodiments, a method for controlling synchronous rectification includes: receiving a first input voltage; receiving a second input voltage; generating a logic signal based on at least information associated with the first input voltage; receiving the logic signal; generating an adjustment signal based on at least information associated with the logic signal and the first input voltage; receiving the adjustment signal; and generating the output voltage based at least in part on the logic signal and the adjustment signal; and outputting an output voltage; wherein the generating a logic signal based on at least information associated with the first input voltage includes: at a beginning of a first switching cycle of the logic signal, changing the logic signal from a first logic level to a second logic level; during the first switching cycle of the logic signal, from the beginning of the first switching cycle of the logic signal to a first time, keeping the logic signal at the second logic level; and during the first switching cycle of the logic signal, at the first time, changing the logic signal from the second logic level to the first logic level; wherein the generating an adjustment signal based on at least information associated with the logic signal and the first input voltage includes, during a first time duration that starts at the beginning of the first switching cycle of the logic signal: determining a reference voltage equal to a first reference value; and if a voltage difference from the first input voltage to the second input voltage is larger than the first reference value, generating the adjustment signal that is not equal to zero based on at least information associated with the voltage difference and the first reference value; wherein the generating an adjustment signal based on at least information associated with the logic signal and the first input voltage further includes, after an end of the first time duration until the first time: determining the reference voltage equal to a second reference value, the second reference value being different from the first reference value; and if the voltage difference from the first input voltage to the second input voltage is larger than the second reference value, generating the adjustment signal that is not equal to zero based on at least information associated with the voltage difference and the second reference value; wherein the generating the output voltage based at least in part on the logic signal and the adjustment signal includes, from the beginning of the first switching cycle of the logic signal to the first time, if the adjustment signal is not equal to zero: changing the output voltage from a first voltage value to a second voltage value; and keep the output voltage at the second logic level; wherein: the first voltage value corresponds to the second logic level; and the second voltage value corresponds to the second logic level; wherein the voltage difference from the first input voltage to the second input voltage is equal to the first input voltage minus the second input voltage. For example, the method for controlling synchronous rectification is implemented according to at least FIG. 8, FIG. 9, and/or FIG. 10.

As an example, the generating an adjustment signal based on at least information associated with the logic signal and the first input voltage further includes: during the first time duration that starts at the beginning of the first switching cycle of the logic signal, if the voltage difference from the first input voltage to the second input voltage is not larger than the first reference value, generating the adjustment signal that is equal to zero; and after the end of the first time duration until the first time, if the voltage difference from the first input voltage to the second input voltage is not larger than the second reference value, generating the adjustment signal that is equal to zero. For example, the generating the output voltage based at least in part on the logic signal and the adjustment signal further includes, when the logic signal is at the second logic level, if the adjustment signal is equal to zero: keeping the output voltage constant at a third voltage value; and keeping the output voltage at the second logic level; wherein the third voltage value corresponds to the second logic level. For example, the second voltage value and the third voltage value are the same. As an example, the generating the output voltage based at least in part on the logic signal and the adjustment signal further includes, when the logic signal is at the second logic level, if the adjustment signal is not equal to zero: reducing the output voltage from the first voltage value to the second voltage value; and keeping the output voltage at the second logic level; wherein the first voltage value is larger than the second voltage value.

For example, the generating the output voltage based at least in part on the logic signal and the adjustment signal further includes, when the logic signal is at the first logic level: keeping the output voltage constant at a third voltage value regardless of whether or not the adjustment signal is equal to zero; and keeping the output voltage at the first logic level; wherein the third voltage value corresponds to the first logic level. As an example, the third voltage value is less than the first voltage value; and the third voltage value is less than the second voltage value. For example, the first logic level is a logic low level; and the second logic level is a logic high level.

As an example, the generating an adjustment signal based on at least information associated with the logic signal and the first input voltage further includes, during the first switching cycle of the logic signal, from the beginning of the first switching cycle of the logic signal to the first time, increasing the reference voltage from the first reference value to the second reference value; and the first reference value is larger than the second reference value. For example, the first reference value is smaller than zero; and the second reference value is equal to a predetermined constant multiplied by the first reference value; wherein the predetermined constant is larger than one.

As an example, the generating a logic signal based on at least information associated with the first input voltage further includes: at a beginning of a second switching cycle of the logic signal, changing the logic signal from the first logic level to the second logic level; during the second switching cycle of the logic signal, from the beginning of the second switching cycle of the logic signal to a second time, keeping the logic signal at the second logic level; and during the second switching cycle of the logic signal, at the second time, changing the logic signal from the second logic level to the first logic level; wherein the second switching cycle precedes the first switching cycle. For example, the first time duration is equal to a predetermined constant multiplied by a second time duration from the beginning of the second switching cycle of the logic signal to the second time; and the predetermined constant is larger than zero and smaller than one. As an example, the second switching cycle precedes immediately the first switching cycle; wherein an end of the second switching cycle is the beginning of the first switching cycle.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling synchronous rectification, the system comprising:

- a first controller terminal configured to receive a first input voltage;
- a second controller terminal biased to a second input voltage;
- a third controller terminal configured to output an output voltage;
- a first signal generator configured to generate a logic signal based on at least information associated with the first input voltage;
- a second signal generator configured to receive the logic signal and generate an adjustment signal based on at least information associated with the logic signal and the first input voltage; and
- a driver configured to receive the logic signal and the adjustment signal and generate the output voltage based at least in part on the logic signal and the adjustment signal;

wherein the first signal generator is further configured to:

- at a beginning of a first switching cycle of the logic signal, change the logic signal from a first logic level to a second logic level;
- during the first switching cycle of the logic signal, from the beginning of the first switching cycle of the logic signal to a first time, keep the logic signal at the second logic level; and
- during the first switching cycle of the logic signal, at the first time, change the logic signal from the second logic level to the first logic level;

wherein the second signal generator is further configured to, during a first time duration that starts at the beginning of the first switching cycle of the logic signal:

- determine a reference voltage equal to a first reference value; and
- if a voltage difference from the first input voltage to the second input voltage is larger than the first reference value, generate the adjustment signal that is not equal to zero based on at least information associated with the voltage difference and the first reference value;

wherein the second signal generator is further configured to, after an end of the first time duration until the first time:

- determine the reference voltage equal to a second reference value, the second reference value being different from the first reference value; and if the voltage difference from the first input voltage to the second input voltage is larger than the second reference value, generate the adjustment signal that is not equal to zero based on at least information associated with the voltage difference and the second reference value;

wherein the driver is configured to, from the beginning of the first switching cycle of the logic signal to the first time, if the adjustment signal is not equal to zero:

change the output voltage from a first voltage value to a second voltage value; and keep the output voltage at the second logic level;

wherein:

the first voltage value corresponds to the second logic level; and the second voltage value corresponds to the second logic level;

wherein the voltage difference from the first input voltage to the second input voltage is equal to the first input voltage minus the second input voltage.

2. The system of claim 1 wherein the second signal generator is further configured to:

during the first time duration that starts at the beginning of the first switching cycle of the logic signal, if the voltage difference from the first input voltage to the second input voltage is not larger than the first reference value, generate the adjustment signal that is equal to zero; and after the end of the first time duration until the first time, if the voltage difference from the first input voltage to the second input voltage is not larger than the second reference value, generate the adjustment signal that is equal to zero.

3. The system of claim 2 wherein the driver is further configured to, when the logic signal is at the second logic level, if the adjustment signal is equal to zero:

keep the output voltage constant at a third voltage value; and keep the output voltage at the second logic level;

wherein the third voltage value corresponds to the second logic level.

4. The system of claim 3 wherein the second voltage value and the third voltage value are the same.

5. The system of claim 1 wherein the driver is further configured to, when the logic signal is at the second logic level, if the adjustment signal is not equal to zero:

reduce the output voltage from the first voltage value to the second voltage value; and keep the output voltage at the second logic level;

wherein the first voltage value is larger than the second voltage value.

6. The system of claim 1 wherein the driver is further configured to, when the logic signal is at the first logic level:

keep the output voltage constant at a third voltage value regardless of whether or not the adjustment signal is equal to zero; and keep the output voltage at the first logic level;

wherein the third voltage value corresponds to the first logic level.

7. The system of claim 6 wherein:

the third voltage value is less than the first voltage value; and the third voltage value is less than the second voltage value.

8. The system of claim 1 wherein:

the first logic level is a logic low level; and the second logic level is a logic high level.

9. The system of claim 1 wherein:

the second signal generator is further configured to, during the first switching cycle of the logic signal, from the beginning of the first switching cycle of the logic signal to the first time, increase the reference voltage from the first reference value to the second reference value; and the first reference value is larger than the second reference value.

10. The system of claim 9 wherein:

the first reference value is smaller than zero; and the second reference value is equal to a predetermined constant multiplied by the first reference value;

wherein the predetermined constant is larger than one.

11. The system of claim 1 wherein:

the first signal generator is further configured to:

at a beginning of a second switching cycle of the logic signal, change the logic signal from the first logic level to the second logic level;

during the second switching cycle of the logic signal, from the beginning of the second switching cycle of the logic signal to a second time, keep the logic signal at the second logic level; and during the second switching cycle of the logic signal, at the second time, change the logic signal from the second logic level to the first logic level;

wherein the second switching cycle precedes the first switching cycle.

12. The system of claim 11 wherein:

the first time duration is equal to a predetermined constant multiplied by a second time duration from the beginning of the second switching cycle of the logic signal to the second time; and the predetermined constant is larger than zero and smaller than one.

13. The system of claim 11 wherein:

the second switching cycle precedes immediately the first switching cycle;

wherein an end of the second switching cycle is the beginning of the first switching cycle.

14. A method for controlling synchronous rectification, the method comprising:

receiving a first input voltage;

receiving a second input voltage;

generating a logic signal based on at least information associated with the first input voltage;

receiving the logic signal;

generating an adjustment signal based on at least information associated with the logic signal and the first input voltage;

receiving the adjustment signal;

generating the output voltage based at least in part on the logic signal and the adjustment signal; and outputting an output voltage;

wherein the generating a logic signal based on at least information associated with the first input voltage includes:

at a beginning of a first switching cycle of the logic signal, changing the logic signal from a first logic level to a second logic level;

during the first switching cycle of the logic signal, from the beginning of the first switching cycle of the logic signal to a first time, keeping the logic signal at the second logic level; and during the first switching cycle of the logic signal, at the first time, changing the logic signal from the second logic level to the first logic level;

wherein the generating an adjustment signal based on at least information associated with the logic signal and the first input voltage includes, during a first time duration that starts at the beginning of the first switching cycle of the logic signal:

determining a reference voltage equal to a first reference value; and if a voltage difference from the first input voltage to the second input voltage is larger than the first reference value, generating the adjustment signal that is not equal to zero based on at least information associated with the voltage difference and the first reference value;

wherein the generating an adjustment signal based on at least information associated with the logic signal and the first input voltage further includes, after an end of the first time duration until the first time:

determining the reference voltage equal to a second reference value, the second reference value being different from the first reference value; and if the voltage difference from the first input voltage to the second input voltage is larger than the second reference value, generating the adjustment signal that is not equal to zero based on at least information associated with the voltage difference and the second reference value;

wherein the generating the output voltage based at least in part on the logic signal and the adjustment signal includes, from the beginning of the first switching cycle of the logic signal to the first time, if the adjustment signal is not equal to zero:

changing the output voltage from a first voltage value to a second voltage value; and keeping the output voltage at the second logic level;

wherein:

the first voltage value corresponds to the second logic level; and the second voltage value corresponds to the second logic level;

wherein the voltage difference from the first input voltage to the second input voltage is equal to the first input voltage minus the second input voltage.

15. The method of claim 14 wherein the generating an adjustment signal based on at least information associated with the logic signal and the first input voltage further includes:

during the first time duration that starts at the beginning of the first switching cycle of the logic signal, if the voltage difference from the first input voltage to the second input voltage is not larger than the first reference value, generating the adjustment signal that is equal to zero; and after the end of the first time duration until the first time, if the voltage difference from the first input voltage to the second input voltage is not larger than the second reference value, generating the adjustment signal that is equal to zero.

16. The method of claim 15 wherein the generating the output voltage based at least in part on the logic signal and the adjustment signal further includes, when the logic signal is at the second logic level, if the adjustment signal is equal to zero:

keeping the output voltage constant at a third voltage value; and keeping the output voltage at the second logic level;

wherein the third voltage value corresponds to the second logic level.

17. The method of claim 16 wherein the second voltage value and the third voltage value are the same.

18. The method of claim 14 wherein the generating the output voltage based at least in part on the logic signal and the adjustment signal further includes, when the logic signal is at the second logic level, if the adjustment signal is not equal to zero:

reducing the output voltage from the first voltage value to the second voltage value; and keeping the output voltage at the second logic level;

wherein the first voltage value is larger than the second voltage value.

19. The method of claim 14 wherein the generating the output voltage based at least in part on the logic signal and the adjustment signal further includes, when the logic signal is at the first logic level:

keeping the output voltage constant at a third voltage value regardless of whether or not the adjustment signal is equal to zero; and keeping the output voltage at the first logic level;

wherein the third voltage value corresponds to the first logic level.

20. The method of claim 19 wherein:

the third voltage value is less than the first voltage value; and the third voltage value is less than the second voltage value.

21. The method of claim 14 wherein:

the first logic level is a logic low level; and the second logic level is a logic high level.

22. The method of claim 14 wherein:

the generating an adjustment signal based on at least information associated with the logic signal and the first input voltage further includes, during the first switching cycle of the logic signal, from the beginning of the first switching cycle of the logic signal to the first time, increasing the reference voltage from the first reference value to the second reference value; and the first reference value is larger than the second reference value.

23. The method of claim 22 wherein:

the first reference value is smaller than zero; and the second reference value is equal to a predetermined constant multiplied by the first reference value;

wherein the predetermined constant is larger than one.

24. The method of claim 14 wherein:

the generating a logic signal based on at least information associated with the first input voltage further includes:

at a beginning of a second switching cycle of the logic signal, changing the logic signal from the first logic level to the second logic level;

during the second switching cycle of the logic signal, from the beginning of the second switching cycle of the logic signal to a second time, keeping the logic signal at the second logic level; and during the second switching cycle of the logic signal, at the second time, changing the logic signal from the second logic level to the first logic level;

wherein the second switching cycle precedes the first switching cycle.

25. The method of claim 24 wherein:

the first time duration is equal to a predetermined constant multiplied by a second time duration from the beginning of the second switching cycle of the logic signal to the second time; and the predetermined constant is larger than zero and smaller than one.

26. The method of claim 24 wherein:

the second switching cycle precedes immediately the first switching cycle;

wherein an end of the second switching cycle is the beginning of the first switching cycle.

* * * * *